(12) United States Patent
Iwasawa

(10) Patent No.: US 8,526,119 B2
(45) Date of Patent: Sep. 3, 2013

(54) COMPACT ZOOM LENS

(75) Inventor: Yoshito Iwasawa, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 103 days.

(21) Appl. No.: 13/046,965

(22) Filed: Mar. 14, 2011

(65) Prior Publication Data

US 2011/0222167 A1 Sep. 15, 2011

(30) Foreign Application Priority Data

Mar. 12, 2010 (KR) .................. 10-2010-0022432

(51) Int. Cl.
*G02B 15/14* (2006.01)

(52) U.S. Cl.
USPC .............................. 359/686; 359/678

(58) Field of Classification Search
USPC ............... 359/676, 678, 680, 681, 682, 686, 359/687
See application file for complete search history.

(56) References Cited

U.S. PATENT DOCUMENTS

| 7,068,440 | B1 * | 6/2006 | Nakatani et al. | 359/676 |
| 8,320,051 | B2 * | 11/2012 | Matsumura et al. | 359/686 |
| 2006/0044423 | A1 | 3/2006 | Hagimori et al. | |
| 2008/0316614 | A1 * | 12/2008 | Yamamoto | 359/676 |

FOREIGN PATENT DOCUMENTS

| JP | 08-248318 A | 9/1996 |
| JP | 10-020191 A | 1/1998 |
| JP | 2004-184627 A | 7/2004 |

* cited by examiner

*Primary Examiner* — Darryl J Collins
(74) *Attorney, Agent, or Firm* — Drinker Biddle & Reath LLP

(57) ABSTRACT

A zoom lens includes a first lens group including an optical path change member that changes an optical path, a second lens group including at least one negative lens and at least one positive lens, and lens groups having a positive refractive power. The first lens group is closer to an object side of the zoom lens and is fixed relative to an image plane during a zooming operation. The second lens group is adapted to move during the zooming operation. Each of the lens groups includes at least one positive lens, and the lens groups are closer to an image plane side of the zoom lens. The zoom lens satisfies vdLP>71, vdL2p<40, and ndL2m>1.71, wherein "vdLP" is an Abbe number, "vdL2p" is an Abbe number, and "ndL2m" is a refractive index.

10 Claims, 20 Drawing Sheets

COMPACT ZOOM LENS

CROSS-REFERENCE TO RELATED PATENT APPLICATION

This application claims the priority benefit of Korean Patent Application No. 10-2010-0022432, filed on Mar. 12, 2010, in the Korean Intellectual Property Office, the entire disclosure of which is incorporated herein by reference.

BACKGROUND

1. Field of the Invention

Embodiments relate to a compact zoom lens having a bending-type optical system.

2. Description of the Related Art

Recently, image forming optical devices (such as, digital still cameras or digital camcorders) using solid state image sensors (such as, charge coupled devices or complementary metal-oxide semiconductors) for converting an optical image into an electric signal have become widely and rapidly available. Portability is regarded as an important characteristic for image forming optical devices, and thus, there is increased demand for miniaturization of these devices.

In order to achieve miniaturization of an image forming optical device by reducing its thickness and diameter, there is a need for a design or an apparatus which can minimize the overall length of the optical system and correct for aberration.

SUMMARY

To solve the above and/or other problems, embodiments provide, at least, a compact zoom lens having superior optical performance.

To decrease the thickness of an image forming optical device, embodiments have a structure that refracts an optical path within an optical system so that the thickness of the image forming optical device, such as a camera, is not influenced by the number of lens units being employed.

A bending-type optical system can be implemented, for example, by using a prism that can bend, refract, or change an optical path by 90°. The thickness of the image forming optical device can then be determined by the overall thickness of lenses, which are arranged at an object side of the prism, and an effective diameter of a lens group arranged at an image side of the prism.

Embodiments can minimize the overall length of the optical system and correct for aberration by appropriately setting the number of lenses arranged from the prism to the image side.

According to an embodiment, a zoom lens includes a first lens group including an optical path change member that changes an optical path, a second lens group including at least one negative lens and at least one positive lens, and lens groups having a positive refractive power. The first lens group is closer to an object side of the zoom lens and is fixed relative to an image plane during a zooming operation. The second lens group is adapted to move during the zooming operation. Each of the lens groups includes at least one positive lens, the plurality of lens groups being closer to an image plane side of the zoom lens. The zoom lens satisfies the following conditions: vdLP>71, vdL2p<40, and ndL2m>1.71, wherein "vdLP" is an Abbe number on a line d of a positive lens included in a lens group arranged between the image plane side and the second lens group and having a positive refractive power, "vdL2p" is an Abbe number at a d-line of one of the at least one positive lens included in the second lens group, and "ndL2m" is a refractive index at a d-line of one of the at least one negative lens included in the second lens group.

The second lens group may have a negative refractive power.

The first lens group may have a positive refractive power.

The first lens group may have a negative refractive power.

Another embodiment includes a zoom lens. The zoom lens includes a first lens group including an optical path change member that changes an optical path, a second lens group including at least one negative lens and at least one positive lens, a third lens group having a positive refractive power, and at least one lens group having a positive refractive power. The first lens group is closer to an object side of the zoom lens and is fixed relative to an image plane during a zooming operation. The first lens group has a positive refractive power. The second lens group has a negative refractive power. The third lens group is fixed relative to the image plane during the zooming operation. The at least one lens group is closer to an image plane side of the zoom lens. The zoom lens satisfies the following conditions: vdLP>71, vdL2p<40, and ndL2m>1.71, wherein "vdLP" is an Abbe number on a line d of a positive lens included in a lens group arranged between the image plane side and the second lens group and having a positive refractive power, "vdL2p" is an Abbe number at a d-line d of one of the at least one positive lens included in the second lens group, and "ndL2m" is a refractive index at a d-line of one of the at least one negative lens included in the second lens group.

In the positive lens included in the lens group arranged between the image plane side and the second lens group and having a positive refractive power, at least one surface may be aspherical.

Another embodiment includes a zoom lens. The zoom lens includes a first lens group including an optical path change member that changes an optical path, a second lens group including at least one negative lens, a third lens group including at least one positive lens, and a fourth lens group having a positive refractive power. The first lens group is closer to an object side of the zoom lens and is fixed relative to an image plane during a zooming operation. The second lens group is adapted to move during the zooming operation. The third lens group is fixed during the zooming operation and has a positive refractive power. The fourth lens group is closer to an image plane side of the zoom lens. The zoom lens satisfies the following conditions: vdLP>71 and ndL2m>1.71, wherein "vdLP" is an Abbe number at a d-line of a positive lens included in a lens group arranged between the image plane side and the second lens group and having a positive refractive power, and "ndL2m" is a refractive index at a d-line of one of the at least one negative lens included in the second lens group.

The second lens group may have a negative refractive power.

The first lens group may have a positive refractive power.

In the at least one positive lens included in the third lens group, at least one surface may be aspherical.

The aspherical surface may have a shape in which a positive refractive power decreases closer to a paraxial.

The fourth lens group may include at least one positive lens having an Abbe number greater than 71.

Another embodiment includes a photographing apparatus. The photographing apparatus includes a zoom lens and a photographing device that converts an optical image formed by the zoom lens into an electric signal.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
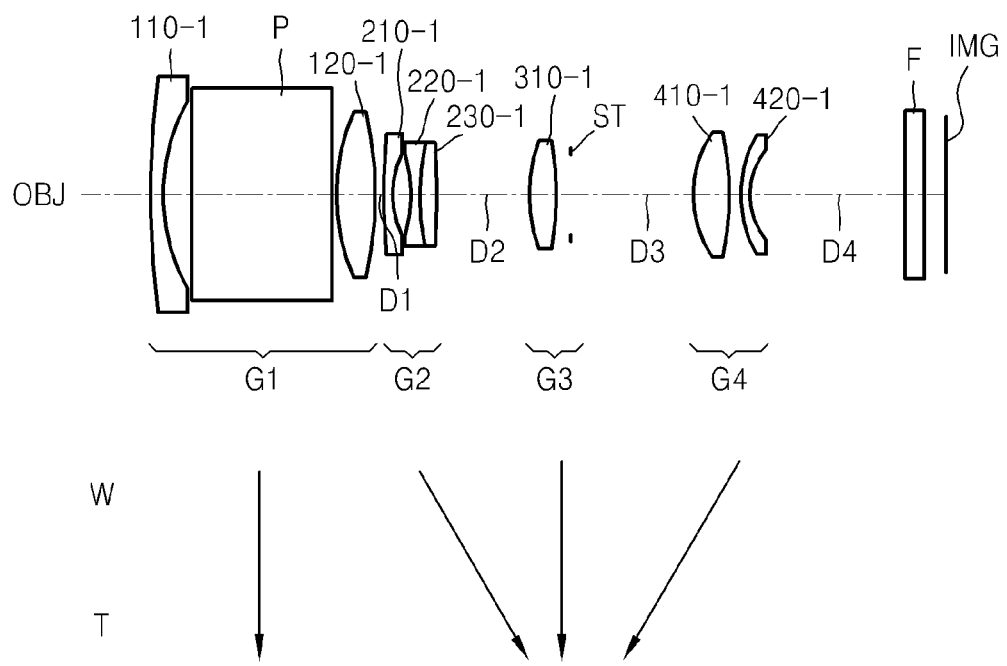
FIG. 1 illustrates an optical arrangement of a zoom lens and movements of lens groups in the zoom lens according to an embodiment.

The attached drawings for illustrating exemplary embodiments are referred to in order to gain a sufficient understanding of the invention, the merits thereof, and the objectives accomplished by the implementation of the invention. Hereinafter, the invention will be described in detail by explaining exemplary embodiments with reference to the attached drawings. Like reference numerals in the drawings denote like elements.

FIGS. 1, 5, 9, 13, and 17 illustrate the optical arrangements of zoom lenses according to embodiments. Referring to these drawings, each zoom lens can include a first lens group G1, a second lens group G2, and a plurality of lens groups having a positive refractive power. The first lens group G1 can be disposed closer to the object OBJ, and the plurality of lens groups can be disposed closer to the image plane IMG side, with the second lens group G2 disposed between the first lens group G1 and the plurality of lens groups. The image plane IMG can be an image photographing surface of a photographing apparatus (not shown), such as charge coupled device (CCD) or a complementary metal-oxide semiconductors (CMOS).

The first lens group G1 can be a lens group fixed with respect to the IMG during zooming. The first lens group G1 can include an optical path change member P that bends an optical path. The optical path change member P may be a reflection member, for example, a prism. The second lens group G2 may include at least one negative lens. At least two lens groups having a positive refractive power can be arranged between the second lens group G2 and the IMG.

In the zoom lenses according to the embodiments, the optical path change member P can be included in the first lens group G1 to refract the optical path within an optical system, thereby facilitating the miniaturization of the zoom lens. Accordingly, the thickness of a camera may not be dependent on the total number of lenses constituting a zoom lens. The thickness of a camera can be dependent on the thickness of the lenses arranged at the OBJ side of the optical path change member P. Furthermore, the overall length of the zoom lens may be decreased by reducing the number of lenses constituting the optical system.

The zoom lens can be configured to satisfy, at least, the following conditions.

$$vdLP > 71 \quad (1)$$

The first condition refers to "vdLP" which can be the Abbe number at a d-line of a positive lens included in a lens group arranged between the IMG side and the second lens group G2 and having a positive refractive power.

$$ndL2m > 1.71 \quad (2)$$

The second condition refers to "ndL2m" which can be the refractive index at a d-line of a negative lens included in the second lens group G2. Also, the second lens group G2 may include at least one positive lens and may satisfy, at least, the following condition.

$$vdL2p < 40 \quad (3)$$

The condition refers to "vdL2p" which can be the Abbe number at a d-line of a positive lens included in the second lens group G2.

The above conditions can be provided so as to decrease the overall length of the zoom lens by using a smaller number of lenses. Simultaneously, the above conditions can appropriately balance the amount of aberration generated in each lens group so as to obtain high image forming performance.

Because of the above conditions, an axial chromatic aberration at a telephoto position may be corrected. Furthermore, lateral chromatic aberration at a wide angle position may be corrected at the same time. Also, chromatic aberration generated in each lens group may be reduced.

The first lens group G1 can be a lens group fixed during zooming and can have a positive or a negative refractive power. The second lens group G2 can be a lens group moving during zooming and can have a negative refractive power.

An optical system may be configured with a less number of lenses by appropriately using an aspherical surface. For example, an aspherical surface may be used in the third lens group G3, which may have a positive refractive power. The aspherical surface can have a shape in which a positive refractive power decreases closer to a paraxial. When such an aspherical surface is employed, the amount of spherical aberration generated at the telephoto position may be reduced.

The detailed structures and lens data of zoom lenses according to various embodiments is described below. The aspherical surface in the embodiments may be defined as follows.

$$Z = \frac{Ch^2}{1+\sqrt{1-\varepsilon C^2 h^2}} + A4 \cdot h^4 + A6 \cdot h^6 + A8 \cdot h^8 + A10 \cdot h^{10} \quad (4)$$

The term "h" can denote the height of a lens in a vertical direction with respect to an optical axis, and the term "Z" can denote the distance from the height "h" to the vertex of a lens in a direction along the optical axis. The term "C" can denote the curvature of a paraxial, and "ε" can denote a conic constant. The terms "A4", "A6", "A8", and "A10" can denote aspherical surface coefficients.

In the following description, "f" can denote the synthetic focal length of the overall zoom optical system, and "Fno" can denote an F number, while "ω" can denote a half viewing angle. A mark "*" on a surface number can denote that the surface is an aspherical surface. In each embodiment, the variable distances at the wide angle position, the middle position, and the telephoto position can be respectively indicated by D1, D2, D3, and D4.

<First Embodiment>

FIG. 1 illustrates a zoom lens according to an embodiment. Referring to FIG. 1, the zoom lens according to the present embodiment can include a first lens group G1 having a positive refractive power, a second lens group G2 having a negative refractive power, a third lens group G3 having a positive refractive power, and a fourth lens group G4 having a positive refractive power. The first lens group G1, the second lens group G2, the third lens group G3, and the fourth lens group G4 can be arranged such that the first lens group G1 is closer to the object OBJ side, followed by the second lens group G2 and then the third lens group G3, which are in turn followed by the fourth lens group G4 which is closer to the image plane IMG side. The image plane IMG can be an image photographing surface of a photographing apparatus (not shown), such as charge coupled device (CCD) or a complementary metal-oxide semiconductors (CMOS). An infrared filter F can be arranged between the fourth lens group G4 and the IMG.

The first lens group G1 can include a first lens 110-1, the optical path change member P, and a second lens 120-1. The first lens 110-1 may be a negative lens and may concave toward the IMG side. The second lens 120-1 may be a positive biconvex lens. The second lens group G2 can include a third lens 210-1, a fourth lens 220-1, and a fifth lens 230-1. The third lens 210-1 may be a negative lens and may concave toward the IMG side. The fourth lens 220-1 may be a biconcave lens. The fifth lens 230-1 may be a positive lens. The fourth lens 220-1 and the fifth lens 230-1 can make a doublet lens. The third lens group G3 can include a sixth lens 310-1. The sixth lens 310-1 may be a positive lens in which both surfaces are aspherical. The fourth lens group G4 can include a seventh lens 410-1 that may be a positive lens in which both surfaces are aspherical and an eighth lens 420-1 that may be a negative lens. During the zooming from the wide angle position W to the telephoto position T, the first and third lens groups G1 and G3 can be fixed, as shown by their respective arrows in FIG. 1, whereas the second and fourth lens groups G2 and G4 can be moved, as shown by their respective arrows in FIG. 1. A stop ST can be arranged at the IMG side of the third lens group G3.

Figure 2:
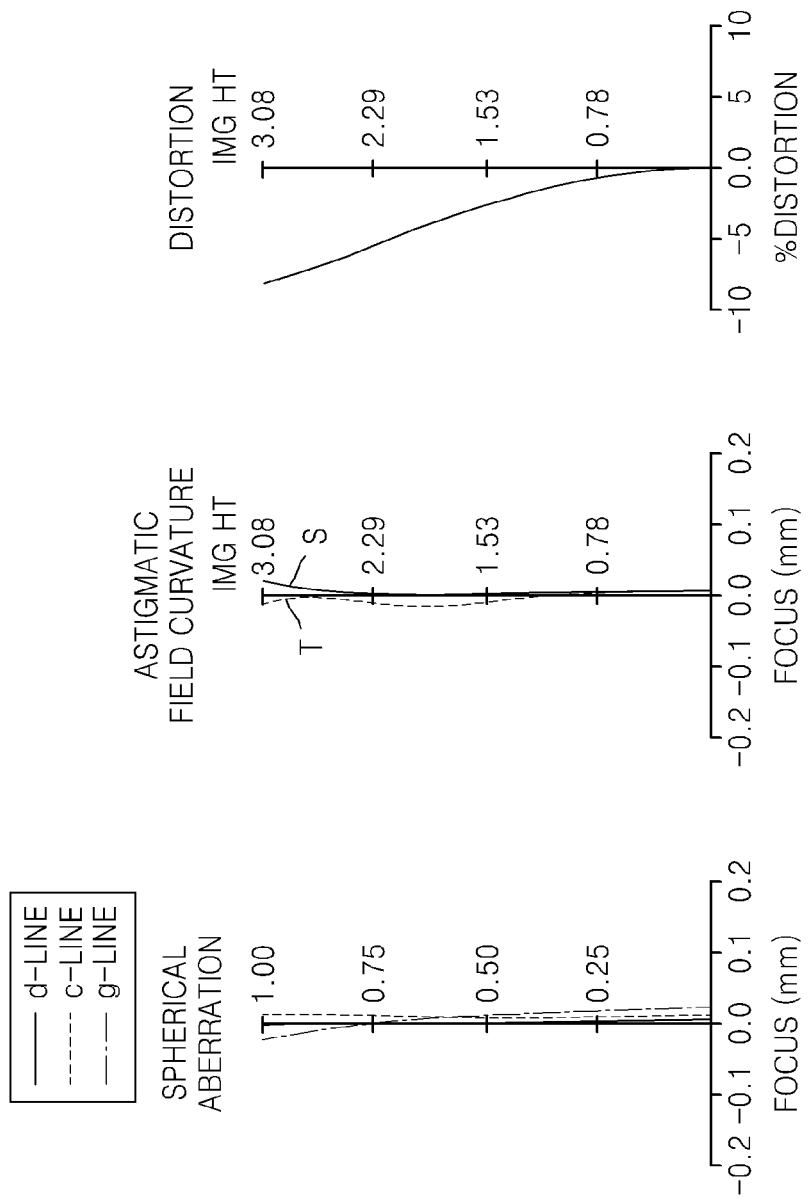
FIG. 2 is an aberration diagram showing longitudinal spherical aberration, astigmatic field curvature, and distortion of the zoom lens of FIG. 1 operating at a wide angle position.
Figure 3:
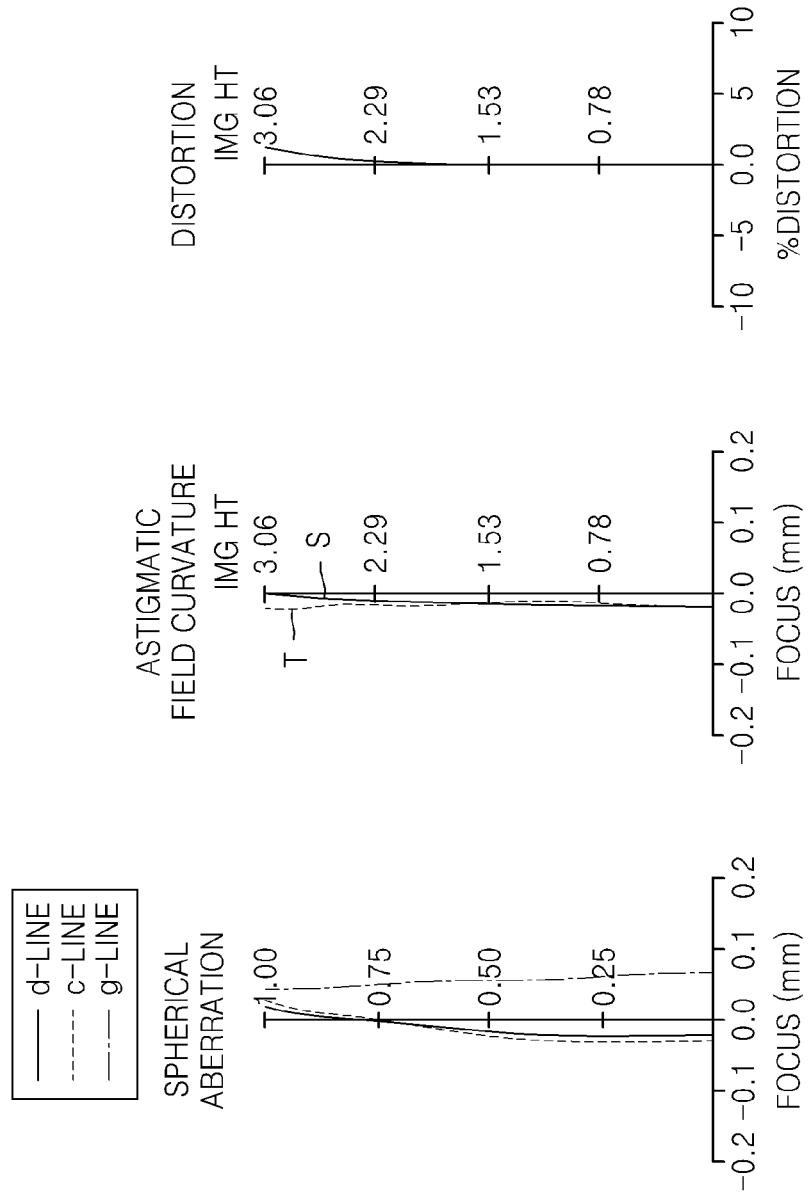
FIG. 3 is an aberration diagram showing longitudinal spherical aberration, astigmatic field curvature, and distortion of the zoom lens of FIG. 1 operating at a middle position between the wide angle position and a telephoto position.
Figure 4:
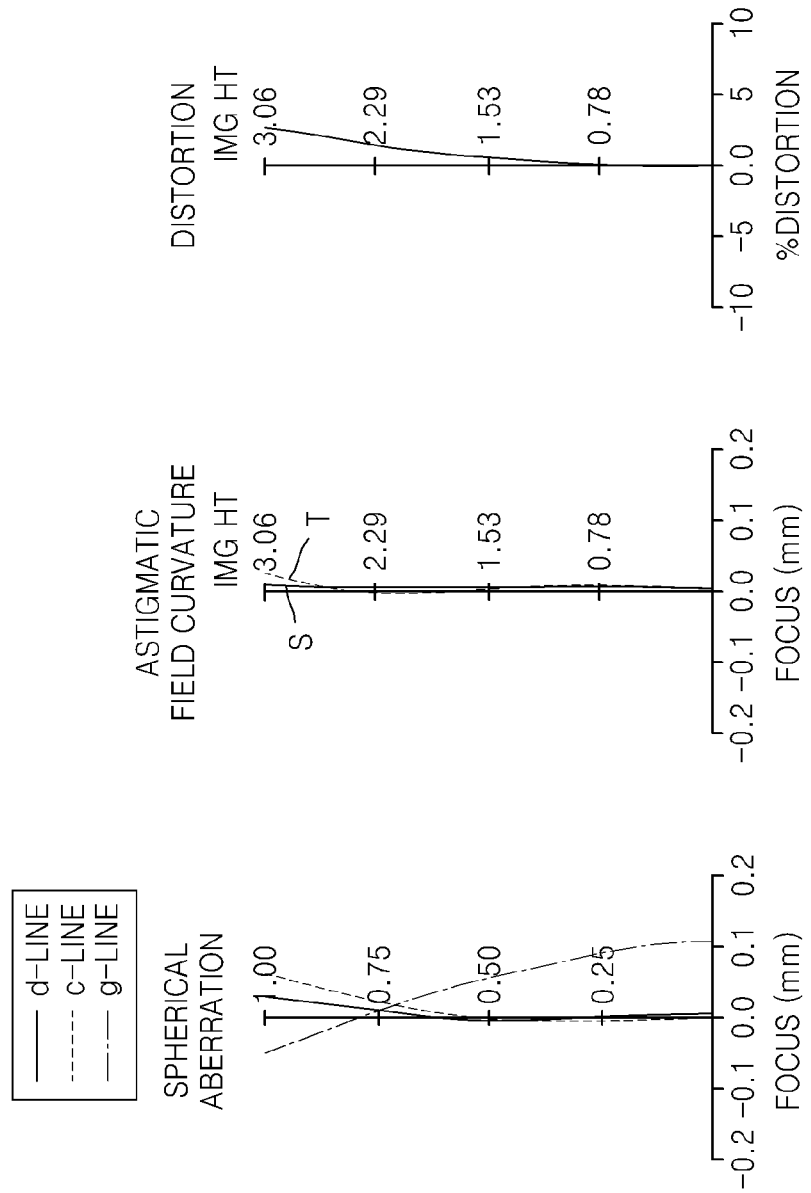
FIG. 4 is an aberration diagram showing longitudinal spherical aberration, astigmatic field curvature, and distortion of the zoom lens of FIG. 1 operating at the telephoto position.

FIGS. 2-4 are aberration diagrams showing longitudinal spherical aberration, astigmatic field curvature, and distortion of the zoom lens of FIG. 1, respectively operating at the wide angle position (FIG. 2), a middle position between the wide angle position and the telephoto position (FIG. 3), and the telephoto position (FIG. 4). Referring to FIGS. 2-4, the longitudinal spherical aberration can appear in light having a wavelength of 656.28 nm (as indicated by a c-line in the longitudinal spherical aberration diagrams of FIGS. 2-4), 587.56 nm (as indicated by a d-line in the longitudinal spherical aberration diagrams of FIG. 2-4), or 435.83 nm (as indicated by a g-line in the longitudinal spherical aberration diagrams of FIGS. 2-4). In the longitudinal spherical aberration diagrams, a solid line indicates the d-line; a dashed line indicates the c-line; and a dot-dashed line indicates the g-line. Also, in the longitudinal spherical aberration diagrams, the horizontal axis can denote defocus, and the vertical axis can denote a rate to an open F value. In the astigmatic field curvature diagrams, the horizontal axis can denote defocus, and the vertical axis can denote the height of an image IMG HT. Also, in the astigmatic field curvature diagrams, a solid line S can denote a sagittal image plane, and a dashed line T can denote a meridional image plane. In the distortion diagrams, the horizontal axis can denote percent distortion, and the vertical axis can denote the height of the image IMG HT.

The following tables show the lens data according to the present embodiment.

| | |
|---|---|
| Fno | 3.47~3.97~4.66 |
| f | 4.65~7.81~13.52 |
| ω | 35.64~21.12~12.42 |
| D1 | 0.350~2.236~3.870 |
| D2 | 3.871~1.985~0.350 |
| D3 | 5.086~3.033~1.021 |
| D4 | 6.483~8.536~10.548 |

| Surface | Radius of Curvature (R) | Thickness (D) | Refractive Index (nd) | Abbe No. (vd) |
|---|---|---|---|---|
| 1 | 47.991 | 0.520 | 1.92286 | 20.88 |
| 2 | 8.288 | 1.155 | | |
| 3 | INF | 5.900 | 1.75890 | 43.93 |
| 4 | INF | 0.200 | | |
| 5* | 8.528 | 1.594 | 1.77377 | 47.17 |
| 6* | −15.074 | D1 | | |
| 7 | 25.800 | 0.380 | 1.83481 | 42.72 |
| 8 | 4.616 | 0.779 | | |
| 9 | −5.502 | 0.330 | 1.77250 | 49.62 |
| 10 | 9.595 | 0.754 | 1.94595 | 17.98 |
| 11 | −65.051 | D2 | | |

-continued

| Surface | Radius of Curvature (R) | Thickness (D) | Refractive Index (nd) | Abbe No. (vd) |
|---|---|---|---|---|
| 12* | 6.541 | 1.078 | 1.49710 | 81.56 |
| 13* | -17.855 | 0.674 | | |
| 14 | INF | D3 | | |
| 15* | 4.137 | 1.525 | 1.49710 | 81.56 |
| 16* | -12.618 | 0.480 | | |
| 17 | 5.146 | 0.400 | 1.94595 | 17.98 |
| 18 | 3.166 | D4 | | |
| 19 | INF | 0.800 | 1.51680 | 64.20 |
| 20 | INF | 0.900 | | |

| Surface | ε | A4 | A6 | A8 | A10 |
|---|---|---|---|---|---|
| 5 | 1.0000 | -0.318865E-03 | 0.218653E-04 | -0.179184E-05 | 0.120754E-06 |
| 6 | 1.0000 | 0.281187E-04 | 0.329931E-04 | -0.277126E-05 | 0.161242E-06 |
| 12 | 1.0000 | -0.477065E-03 | -0.229241E-03 | 0.668947E-04 | -0.832781E-05 |
| 13 | 1.0000 | 0.495287E-03 | -0.240141E-03 | 0.673197E-04 | -0.810232E-05 |
| 15 | 1.0000 | -0.127021E-02 | -0.248685E-03 | 0.554311E-04 | -0.825283E-05 |
| 16 | 1.0000 | 0.141726E-02 | -0.222841E-03 | 0.499010E-04 | -0.792760E-05 |

<Second Embodiment>

Figure 5:
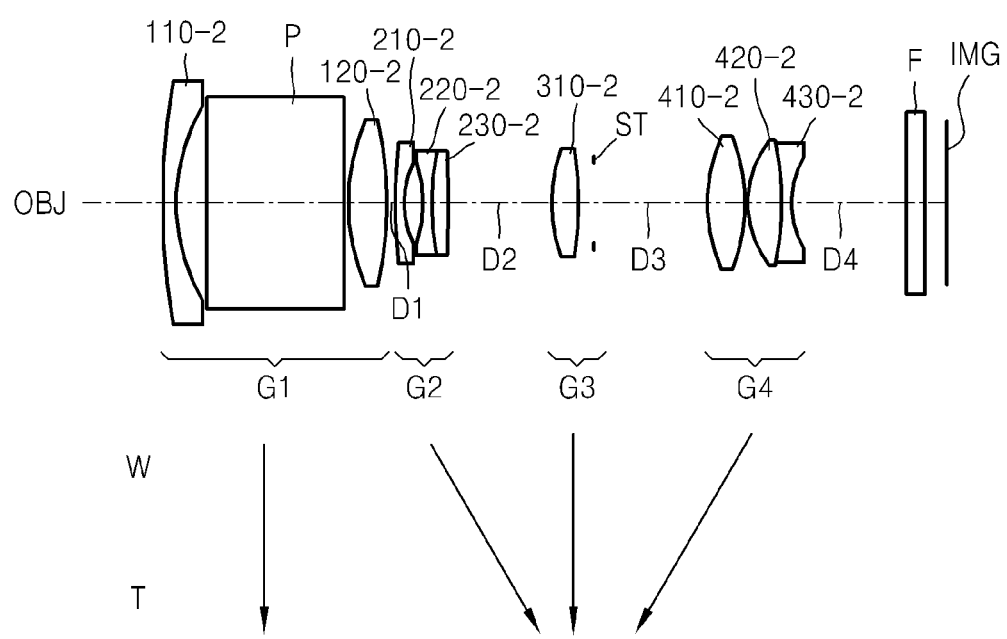
FIG. 5 illustrates an optical arrangement of a zoom lens and movements of lens groups in the zoom lens according to another embodiment.

FIG. 5 illustrates a zoom lens according to another embodiment of the present invention. Referring to FIG. 5, the zoom lens according to the present embodiment can include a first lens group G1 having a positive refractive power, a second lens group G2 having a negative refractive power, a third lens group G3 having a positive refractive power, and a fourth lens group G4 having a positive refractive power. The first lens group G1, the second lens group G2, the third lens group G3, and the fourth lens group G4 can be arranged such that the first lens group G1 is closer to the object OBJ side, followed by the second lens group G2, the third lens group G3, and the fourth lens group G4, which is closer to the image plane IMG side.

The first lens group G1 can include a first lens 110-2, the optical path change member P, and a second lens 120-2. The first lens 110-2 may be a negative lens and may concave toward the IMG side. The second lens 120-2 may be a positive biconvex lens. The second lens group G2 can include a third lens 210-2, a fourth lens 220-2, and a fifth lens 230-2. The third lens 210-2 may be a negative lens and may concave toward the IMG side. The fourth lens 220-2 may be a biconcave lens. The fifth lens 230-2 may be a positive lens. The fourth lens 220-2 and the fifth lens 230-2 can make a doublet lens. The third lens group G3 can include a sixth lens 310-2. The sixth lens 310-2 may be a positive lens in which both surfaces are aspherical. The fourth lens group G4 can include a seventh lens 410-2, an eighth lens 420-2, and a ninth lens 430-2. The seventh lens 410-2 may be a positive lens in which both surfaces are aspherical. The eighth lens 420-2 may be a positive lens. The ninth lens 430-2 may be a negative lens. The eighth lens 420-2 and the ninth lens 430-2 can make a doublet lens.

During the zooming from the wide angle position W to the telephoto position T, the first and third lens groups G1 and G3 can be fixed, as shown by their respective arrows in FIG. 5, whereas the second and fourth lens groups G2 and G4 can be moved, as shown by their respective arrows in FIG. 5. The stop ST can be arranged at the IMG side of the third lens group G3. The infrared filter F can be arranged between the fourth lens group G4 and the IMG.

Figure 6:
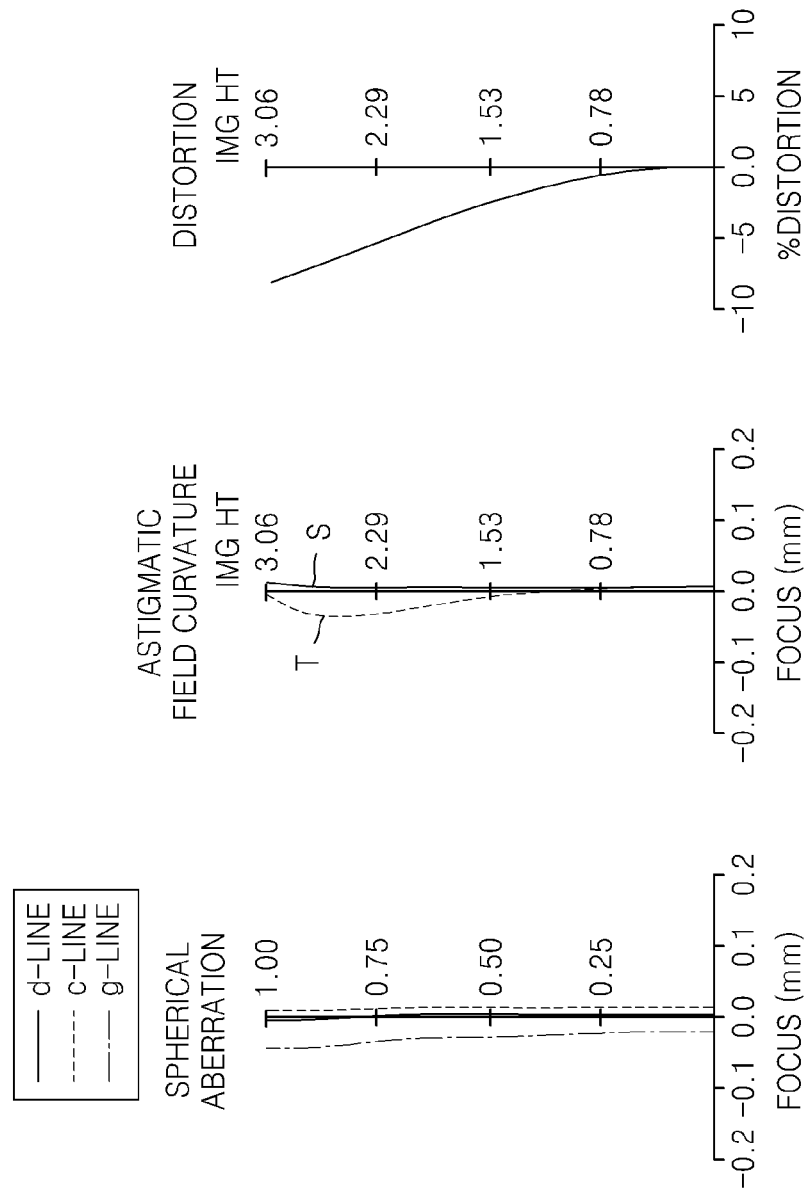
FIG. 6 is an aberration diagram showing longitudinal spherical aberration, astigmatic field curvature, and distortion of the zoom lens of FIG. 5 operating at a wide angle position.
Figure 7:
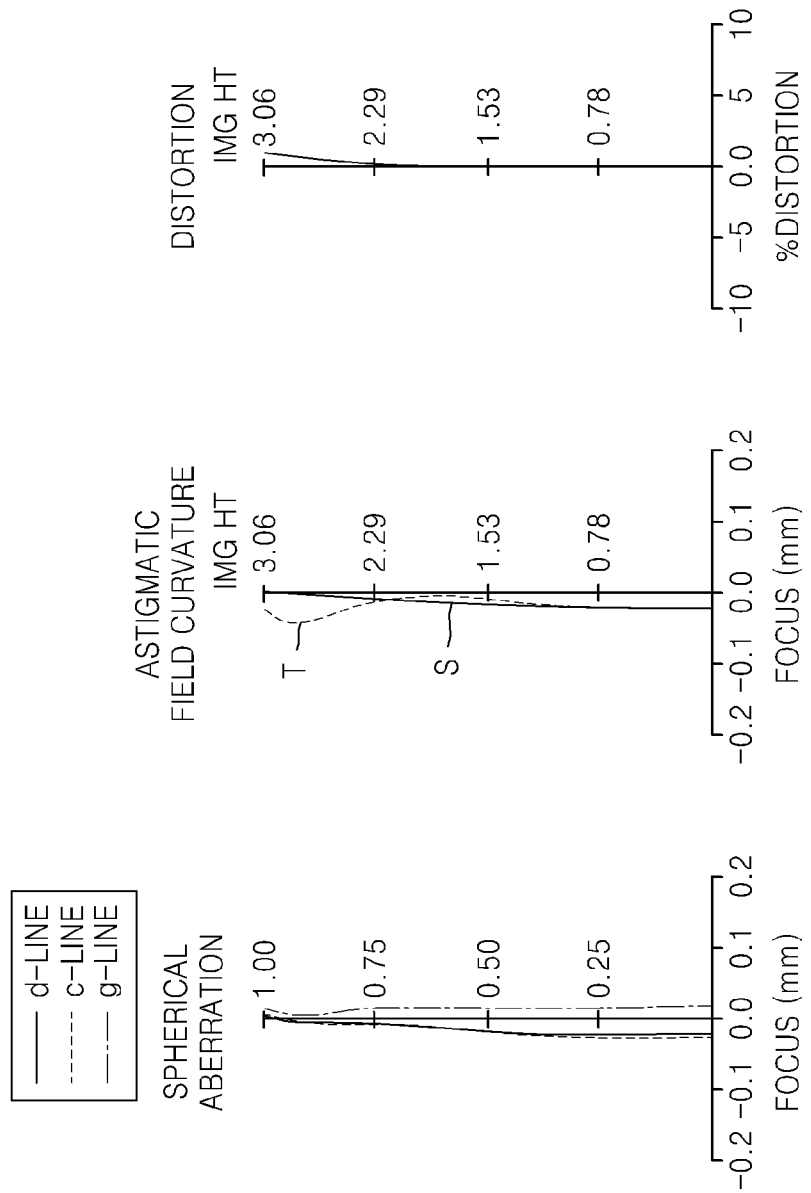
FIG. 7 is an aberration diagram showing longitudinal spherical aberration, astigmatic field curvature, and distortion of the zoom lens of FIG. 5 operating at a middle position between the wide angle position and a telephoto position.
Figure 8:
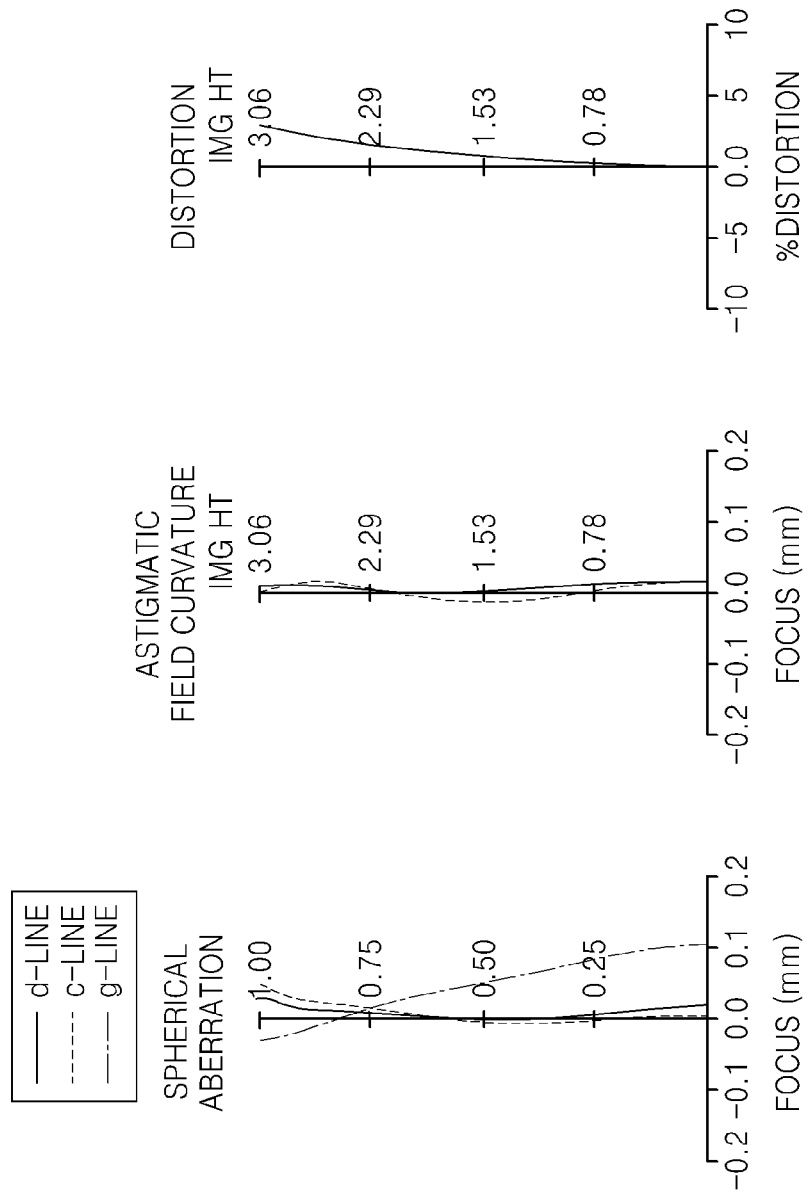
FIG. 8 is an aberration diagram showing longitudinal spherical aberration, astigmatic field curvature, and distortion of the zoom lens of FIG. 5 operating at the telephoto position.

FIGS. 6-8 are aberration diagrams showing longitudinal spherical aberration, astigmatic field curvature, and distortion of the zoom lens of FIG. 5, respectively operating at the wide angle position (FIG. 6), a middle position between the wide angle position and the telephoto position (FIG. 7), and the telephoto position (FIG. 8). Referring to FIGS. 6-8, the longitudinal spherical aberration can appear in light having a wavelength of 656.28 nm (as indicated by a c-line in the longitudinal spherical aberration diagrams of FIGS. 6-8), 587.56 nm (as indicated by a d-line in the longitudinal spherical aberration diagrams of FIG. 6-8), or 435.83 nm (as indicated by a g-line in the longitudinal spherical aberration diagrams of FIGS. 6-8). In the longitudinal spherical aberration diagrams, a solid line indicates the d-line; a dashed line indicates the c-line; and a dot-dashed line indicates the g-line. Also, in the longitudinal spherical aberration diagrams, the horizontal axis can denote defocus, and the vertical axis can denote a rate to an open F value. In the astigmatic field curvature diagrams, the horizontal axis can denote defocus, and the vertical axis can denote the height of an image IMG HT. Also, in the astigmatic field curvature diagrams, a solid line S can denote a sagittal image plane, and a dashed line T can denote a meridional image plane. In the distortion diagrams, the horizontal axis can denote percent distortion, and the vertical axis can denote the height of the image IMG HT.

The following tables show the lens data according to the present embodiment.

| | |
|---|---|
| Fno | 3.42~3.96~4.66 |
| f | 4.62~7.78~13.46 |
| ω | 37.36~22.15~12.98 |
| D1 | 0.350~2.416~4.279 |
| D2 | 4.279~2.213~0.350 |
| D3 | 4.651~2.819~1.005 |
| D4 | 4.664~6.497~8.310 |

| Surface | Radius of Curvature (R) | Thickness (D) | Refractive Index (nd) | Abbe No. (vd) |
|---|---|---|---|---|
| 1 | 25.697 | 0.515 | 1.92286 | 20.88 |
| 2 | 6.883 | 1.270 | | |
| 3 | INF | 5.660 | 1.75890 | 43.93 |
| 4 | INF | 0.205 | | |
| 5* | 8.680 | 1.520 | 1.77377 | 47.17 |
| 6* | -16.273 | D1 | | |
| 7 | 23.147 | 0.380 | 1.88300 | 40.80 |
| 8 | 5.118 | 0.750 | | |
| 9 | -5.341 | 0.330 | 1.80420 | 46.50 |
| 10 | 14.767 | 0.734 | 1.94595 | 17.98 |
| 11 | -20.861 | D2 | | |
| 12* | 6.854 | 1.064 | 1.49710 | 81.56 |
| 13* | -18.211 | 0.651 | | |
| 14 | INF | D3 | | |
| 15* | 5.758 | 1.541 | 1.49710 | 81.56 |

-continued

| Surface | Radius of Curvature (R) | Thickness (D) | Refractive Index (nd) | Abbe No. (vd) |
|---|---|---|---|---|
| 16* | −7.547 | 0.120 | | |
| 17 | 4.321 | 1.410 | 1.48749 | 70.45 |
| 18 | −10.770 | 0.400 | 1.90366 | 31.32 |
| 19 | 3.692 | D4 | | |
| 20 | INF | 0.800 | 1.51680 | 64.20 |
| 21 | INF | 0.900 | | |

| Surface | ϵ | A4 | A6 | A8 | A10 |
|---|---|---|---|---|---|
| 5 | 1.0000 | −0.289110E−03 | 0.401930E−05 | 0.728055E−06 | 0.245351E−07 |
| 6 | 1.0000 | −0.790265E−04 | 0.206272E−04 | −0.599415E−06 | 0.726046E−07 |
| 12 | 1.0000 | −0.447687E−03 | −0.190004E−03 | 0.273701E−04 | −0.311555E−05 |
| 13 | 1.0000 | 0.533934E−03 | −0.181448E−03 | 0.194177E−04 | −0.152083E−05 |
| 15 | 1.0000 | −0.204382E−03 | −0.209476E−03 | 0.543469E−04 | −0.688591E−05 |
| 16 | 1.0000 | 0.142392E−02 | −0.217411E−03 | 0.518503E−04 | −0.667259E−05 |

<Third Embodiment>

Figure 9:
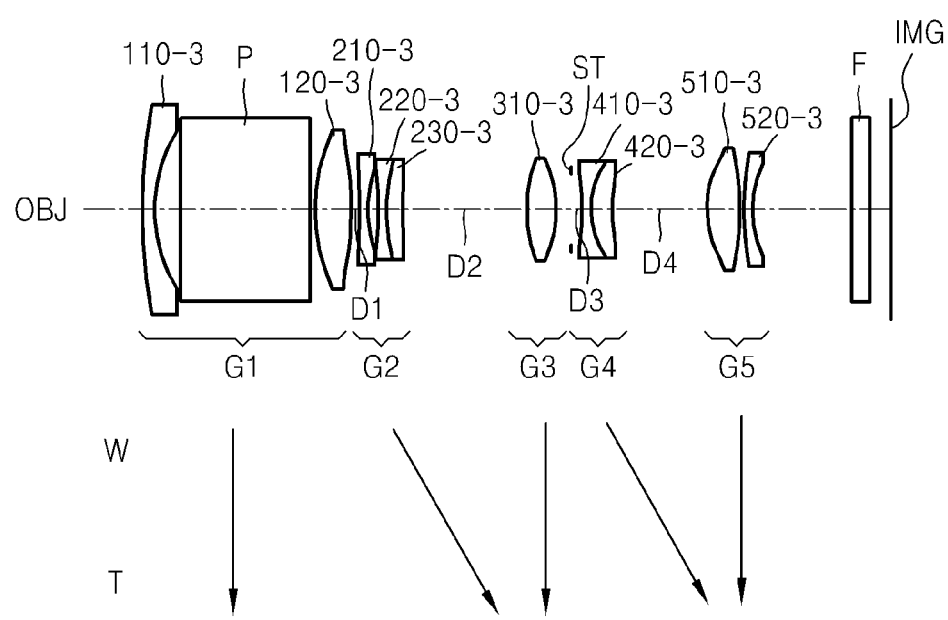
FIG. 9 illustrates an optical arrangement of a zoom lens and movements of lens groups in the zoom lens according to another embodiment.

FIG. 9 illustrates a zoom lens according to another embodiment. Referring to FIG. 9, the zoom lens according to the present embodiment can include a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The first lens group G1, the second lens group G2, the third lens group G3, the fourth lens group G4, and the fifth lens group G5 can be arranged such that the first lens group G1 is closer to the object OBJ side, followed by the second lens group G2, the third lens group G3, the fourth lens group G4, and the fifth lens group G5, which is closer to the image plane IMG side.

The first lens group G1 can include a first lens 110-3, the optical path change member P, and a second lens 120-3. The first lens 110-3 may be a negative lens and may concave toward the IMG side. The second lens 120-3 may be a positive biconvex lens. The second lens group G2 can include a third lens 210-3, a fourth lens 220-3, and a fifth lens 230-3. The third lens 210-3 may be a negative lens and may concave toward the IMG side. The fourth lens 220-3 may be a biconcave lens. The fifth lens 230-3 may be a positive lens. The fourth lens 220-3 and the fifth lens 230-3 can make a doublet lens. The third lens group G3 can include a sixth lens 310-3. The sixth lens 310-3 may be a positive lens in which both surfaces are aspherical. The fourth lens group G4 can include a doublet lens of a seventh lens 410-3 and an eighth lens 420-3. The seventh lens 410-3 may be a negative lens. The eighth lens 420-3 may be a positive lens. The fifth lens group G5 can include a ninth lens 510-3 and a tenth lens 520-3. The ninth lens 510-3 may be a positive lens in which both surfaces are aspherical. The tenth lens 520-3 may be a negative lens.

During the zooming from the wide angle position W to the telephoto position T, the first, third, and fifth lens groups G1, G3, and G5 can be fixed, as shown by their respective arrows in FIG. 9, whereas the second and fourth lens groups G2 and G4 can be moved, as shown by their respective arrows in FIG. 9. The stop ST can be arranged at the IMG side of the third lens group G3. The infrared filter F can be arranged between the fifth lens group G5 and the IMG.

Figure 10:
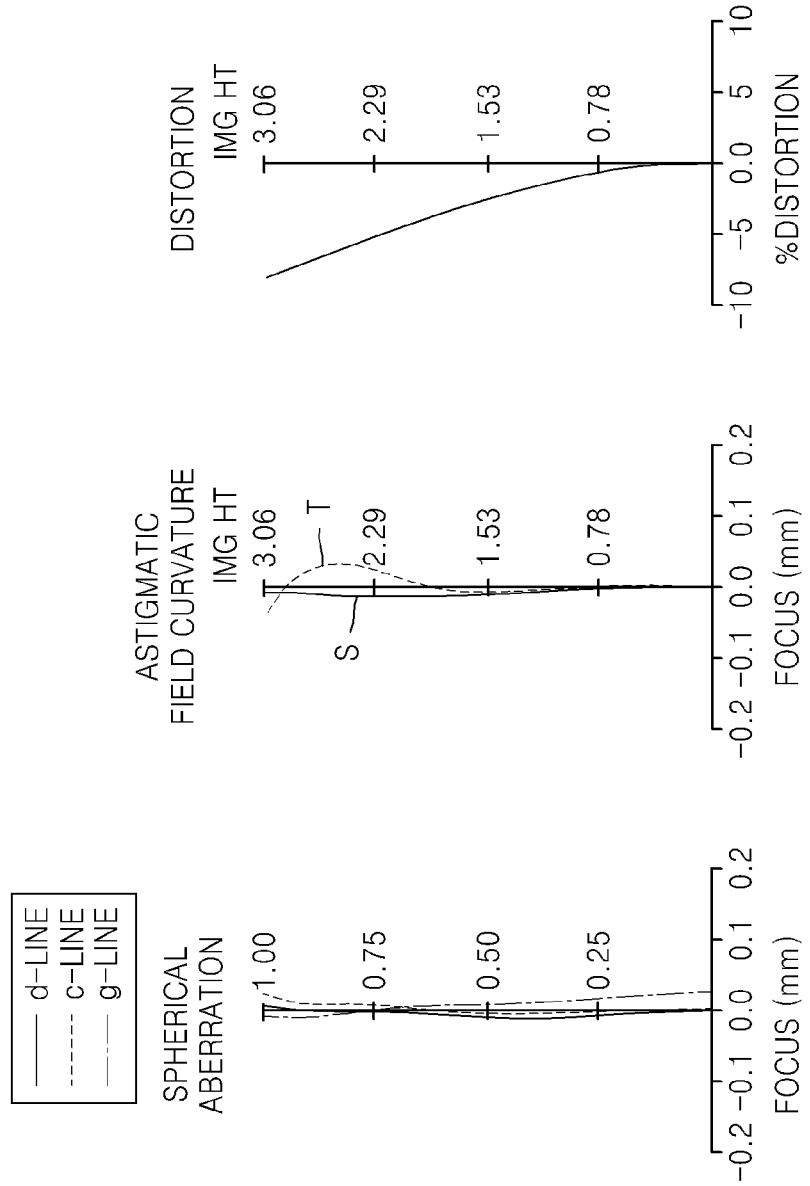
FIG. 10 is an aberration diagram showing longitudinal spherical aberration, astigmatic field curvature, and distortion of the zoom lens of FIG. 9 operating at a wide angle position.
Figure 11:
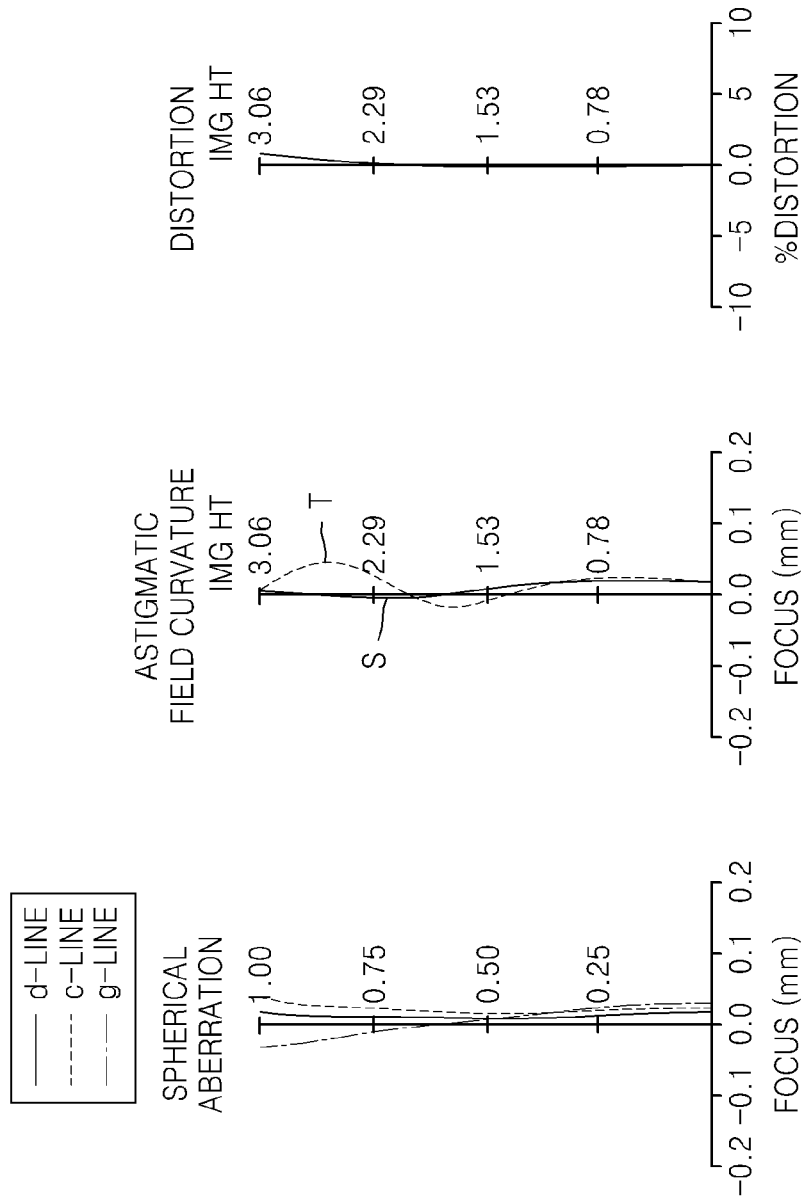
FIG. 11 is an aberration diagram showing longitudinal spherical aberration, astigmatic field curvature, and distortion of the zoom lens of FIG. 9 operating at a middle position between the wide angle position and a telephoto position.
Figure 12:
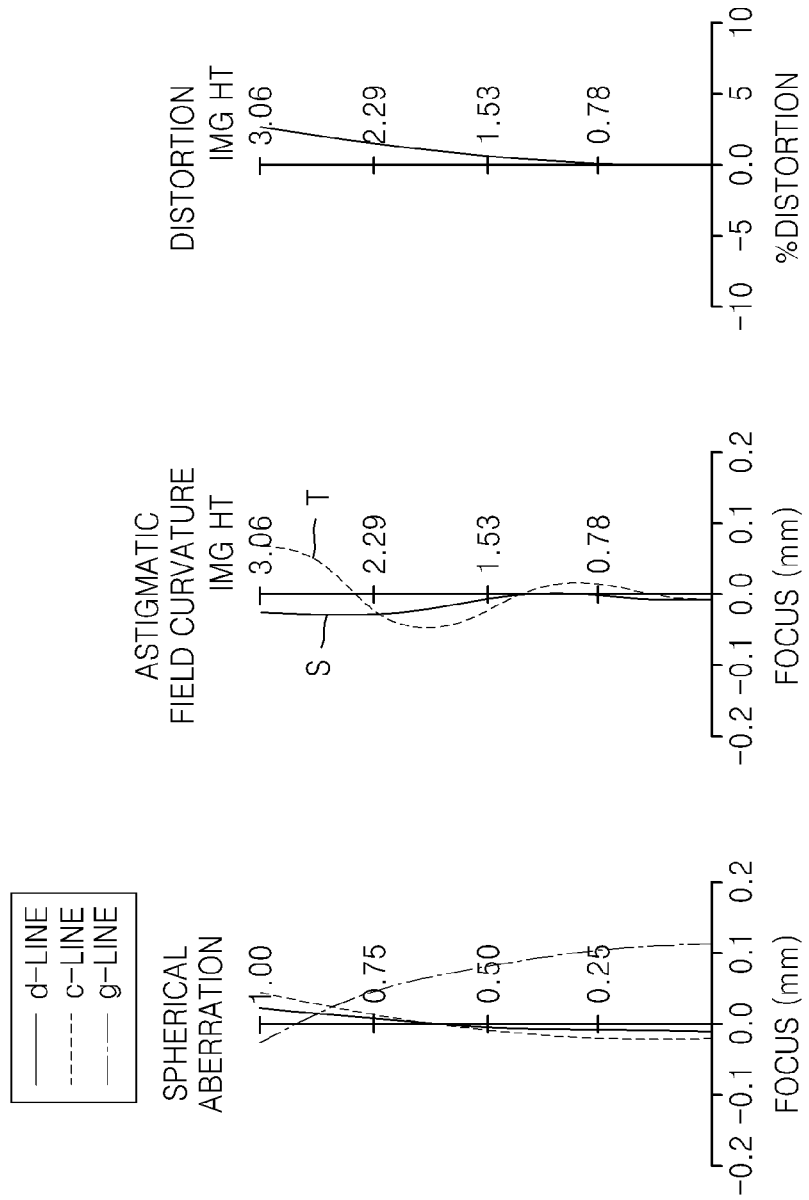
FIG. 12 is an aberration diagram showing longitudinal spherical aberration, astigmatic field curvature, and distortion of the zoom lens of FIG. 9 operating at the telephoto position.

FIGS. 10-12 are aberration diagrams showing longitudinal spherical aberration, astigmatic field curvature, and distortion of the zoom lens of FIG. 9, respectively operating at the wide angle position (FIG. 10), a middle position between the wide angle position and the telephoto position (FIG. 11), and the telephoto position (FIG. 12). Referring to FIGS. 10-12, the longitudinal spherical aberration can appear in light having a wavelength of 656.28 nm (as indicated by a c-line in the longitudinal spherical aberration diagrams of FIGS. 10-12), 587.56 nm (as indicated by a d-line in the longitudinal spherical aberration diagrams of FIG. 10-12), or 435.83 nm (as indicated by a g-line in the longitudinal spherical aberration diagrams of FIGS. 10-12). In the longitudinal spherical aberration diagrams, a solid line indicates the d-line; a dashed line indicates the c-line; and a dot-dashed line indicates the g-line. Also, in the longitudinal spherical aberration diagrams, the horizontal axis can denote defocus, and the vertical axis can denote a rate to an open F value. In the astigmatic field curvature diagrams, the horizontal axis can denote defocus, and the vertical axis can denote the height of an image IMG HT. Also, in the astigmatic field curvature diagrams, a solid line S can denote a sagittal image plane, and a dashed line T can denote a meridional image plane. In the distortion diagrams, the horizontal axis can denote percent distortion, and the vertical axis can denote the height of the image IMG HT.

The following tables show the lens data according to the present embodiment.

| | |
|---|---|
| Fno | 3.48~3.85~4.14 |
| f | 4.65~7.71~13.52 |
| ω | 35.62~21.25~12.42 |
| D1 | 0.405~3.050~5.559 |
| D2 | 5.504~2.859~0.350 |
| D3 | 0.530~2.151~3.892 |
| D4 | 4.210~2.589~0.848 |

| Surface | Radius of Curvature (R) | Thickness (D) | Refractive Index (nd) | Abbe No. (vd) |
|---|---|---|---|---|
| 1 | 27.995 | 0.520 | 1.92286 | 20.88 |
| 2 | 6.718 | 1.187 | | |
| 3 | INF | 5.750 | 1.90366 | 31.32 |
| 4 | INF | 0.200 | | |
| 5* | 8.264 | 1.592 | 1.72903 | 54.04 |
| 6* | −16.199 | D1 | | |
| 7 | −33.255 | 0.380 | 1.88300 | 40.80 |
| 8 | 6.840 | 0.457 | | |
| 9 | −16.340 | 0.330 | 1.80420 | 46.50 |
| 10 | 8.199 | 0.732 | 1.94595 | 17.98 |
| 11 | 57.797 | D2 | | |
| 12* | 5.496 | 1.289 | 1.49710 | 81.56 |
| 13* | −5.713 | 0.670 | | |
| 14 | INF | D3 | | |
| 15 | −10.440 | 0.350 | 1.73077 | 40.50 |
| 16 | 3.617 | 0.970 | 1.91082 | 35.25 |
| 17 | 13.250 | D4 | | |
| 18* | 4.423 | 1.462 | 1.55332 | 71.68 |
| 19* | −10.431 | 0.166 | | |
| 20 | 16.296 | 0.400 | 1.94595 | 17.98 |

-continued

| Surface | Radius of Curvature (R) | Thickness (D) | Refractive Index (nd) | Abbe No. (vd) |
|---|---|---|---|---|
| 21 | 4.773 | 4.422 | | |
| 22 | INF | 0.800 | 1.51680 | 64.20 |
| 23 | INF | 0.900 | | |

| Surface | ε | A4 | A6 | A8 | A10 |
|---|---|---|---|---|---|
| 5 | 1.0000 | −0.425028E−03 | 0.490941E−04 | −0.556445E−05 | 0.307597E−06 |
| 6 | 1.0000 | −0.133821E−03 | 0.535430E−04 | −0.575982E−05 | 0.325559E−06 |
| 12 | 1.0000 | −0.122014E−02 | −0.465210E−03 | 0.146461E−03 | −0.187512E−04 |
| 13 | 1.0000 | 0.130530E−02 | −0.396271E−03 | 0.125678E−03 | −0.160501E−04 |
| 18 | 1.0000 | −0.365174E−03 | −0.481212E−03 | 0.104110E−03 | −0.116055E−04 |
| 19 | 1.0000 | 0.370079E−02 | −0.484353E−03 | 0.983538E−04 | −0.116537E−04 |

<Fourth Embodiment>

Figure 13:
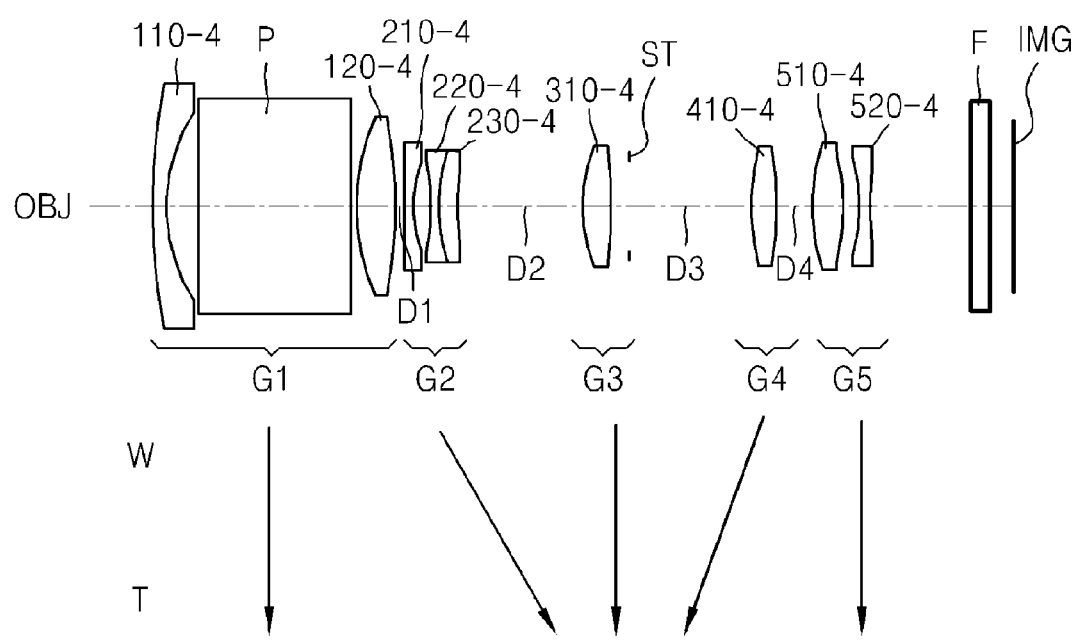
FIG. 13 illustrates an optical arrangement of a zoom lens and movements of lens groups in the zoom lens according to another embodiment.

FIG. 13 illustrates a zoom lens according to another embodiment. Referring to FIG. 13, the zoom lens according to the present embodiment can include a first lens group G1 having a positive refractive power, a second lens group G2 having a negative refractive power, a third lens group G3 having a positive refractive power, a fourth lens group G4 having a positive refractive power, and a fifth lens group G5 having a negative refractive power. The first lens group G1, the second lens group G2, the third lens group G3, the fourth lens group G4, and the fifth lens group G5 can be arranged such that the first lens group G1 is closer to the object OBJ side, followed by the second lens group G2, the third lens group G3, the fourth lens group G4, and the fifth lens group G5, which is closer to the image plane IMG side.

The first lens group G1 can include a first lens 110-4, the optical path change member P, and a second lens 120-4. The first lens 110-4 may be a negative lens and may concave toward the IMG side. The second lens 120-4 may be a positive biconvex lens. The second lens group G2 can include a third lens 210-4, a fourth lens 220-4, and a fifth lens 230-4. The third lens 210-4 may be a negative lens and may concave toward the IMG side. The fourth lens 220-4 may be a biconcave lens. The fifth lens 230-4 may be a positive lens. The fourth lens 220-4 and the fifth lens 230-4 can make a doublet lens. The third lens group G3 can include a sixth lens 310-4. The sixth lens 310-4 may be a positive lens in which both surfaces are aspherical. The fourth lens group G4 can include a seventh lens 410-4. The seventh lens 410-4 may be a positive lens in which both surfaces are aspherical. The fifth lens group G5 can include an eighth lens 510-4 and a ninth lens 520-4. The eighth lens 510-4 may be a positive lens in which both surfaces are aspherical. The ninth lens 520-4 may be a negative positive.

During the zooming from the wide angle position W to the telephoto position T, the first, third, and fifth lens groups G1, G3, and G5 can be fixed, as indicated by their respective arrows in FIG. 13, whereas the second and fourth lens groups G2 and G4 can be moved, as indicated by their respective arrows in FIG. 13. The stop ST can be arranged at the IMG side of the third lens group G3. The infrared filter F can be arranged between the fifth lens group G5 and the IMG.

Figure 14:
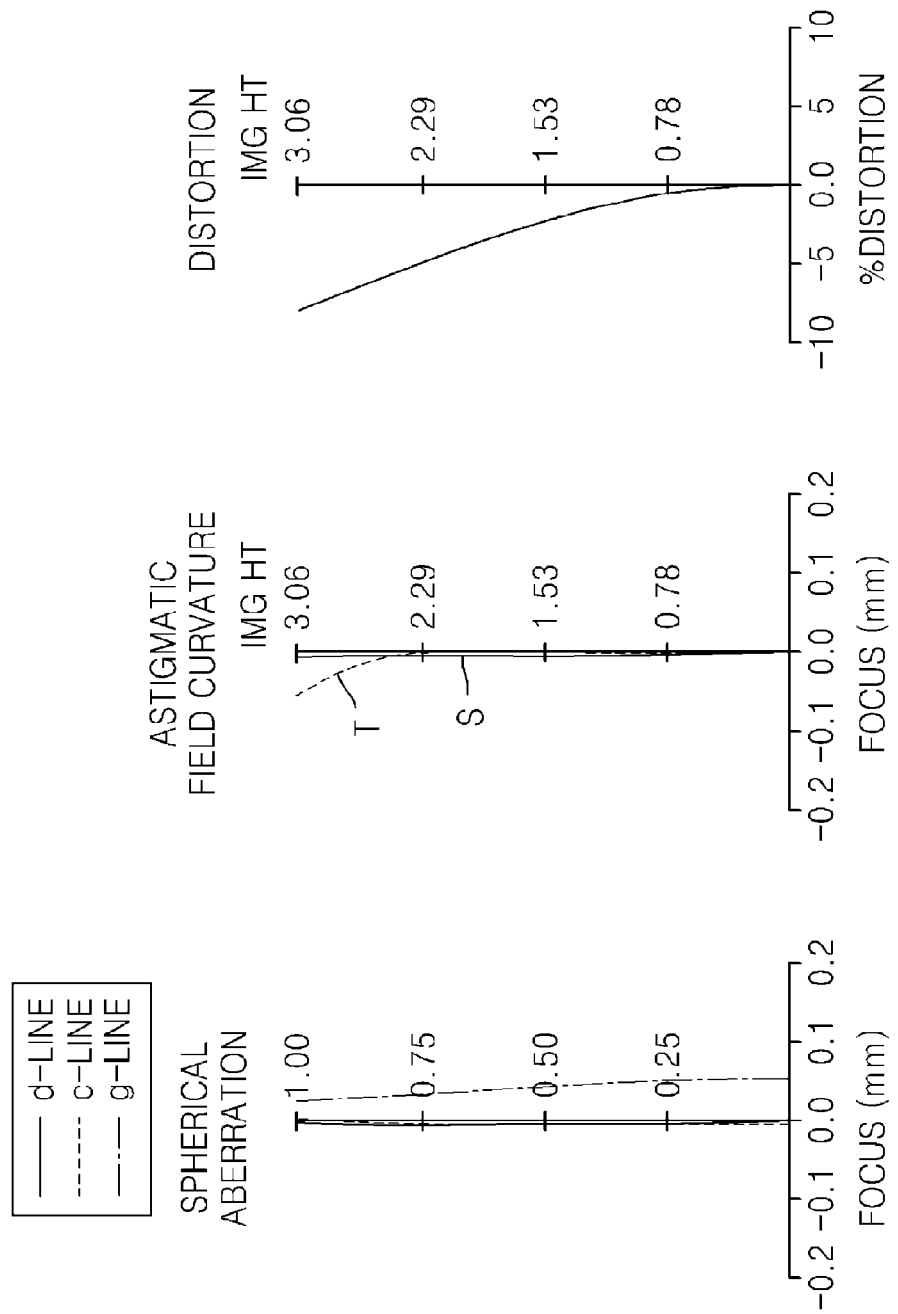
FIG. 14 is an aberration diagram showing longitudinal spherical aberration, astigmatic field curvature, and distortion of the zoom lens of FIG. 13 operating at a wide angle position.
Figure 15:
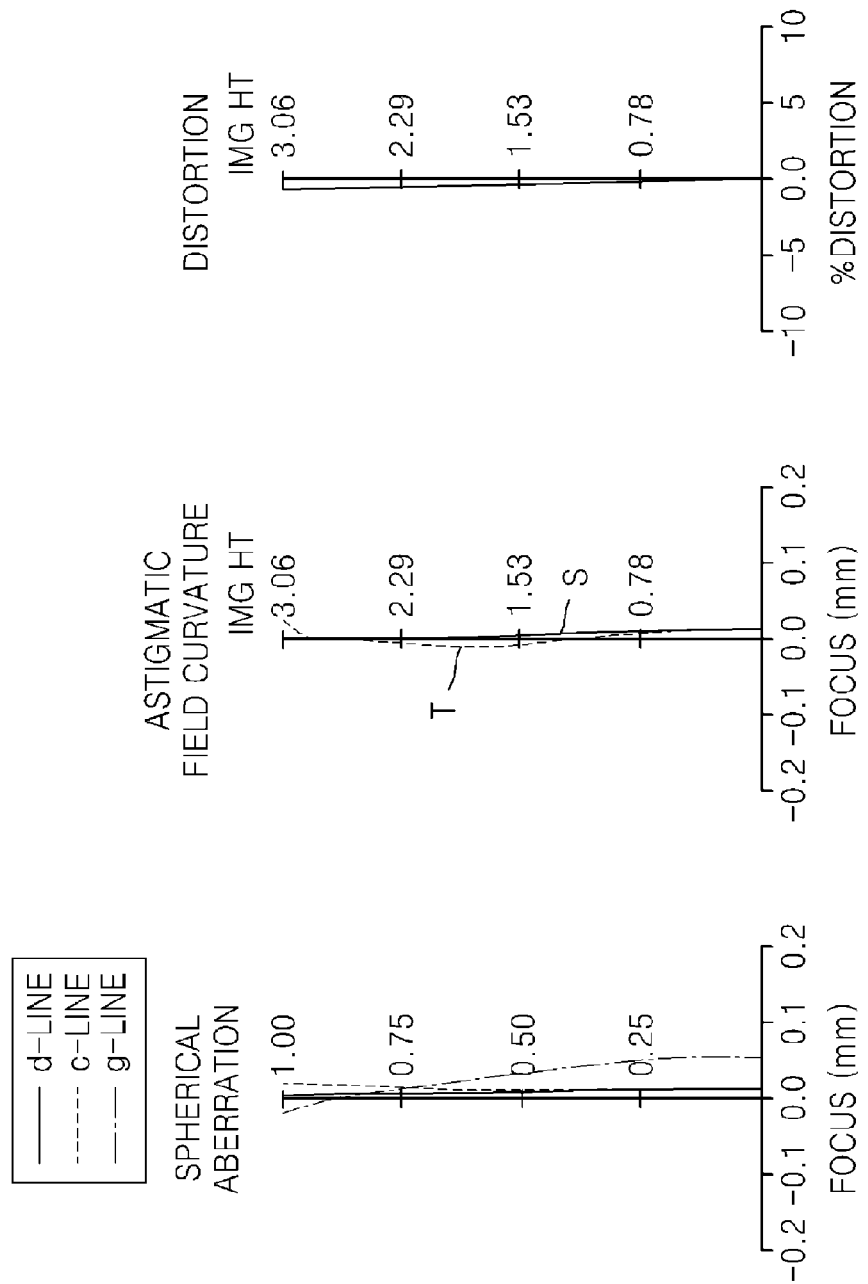
FIG. 15 is an aberration diagram showing longitudinal spherical aberration, astigmatic field curvature, and distortion of the zoom lens of FIG. 13 operating at a middle position between the wide angle position and a telephoto position.
Figure 16:
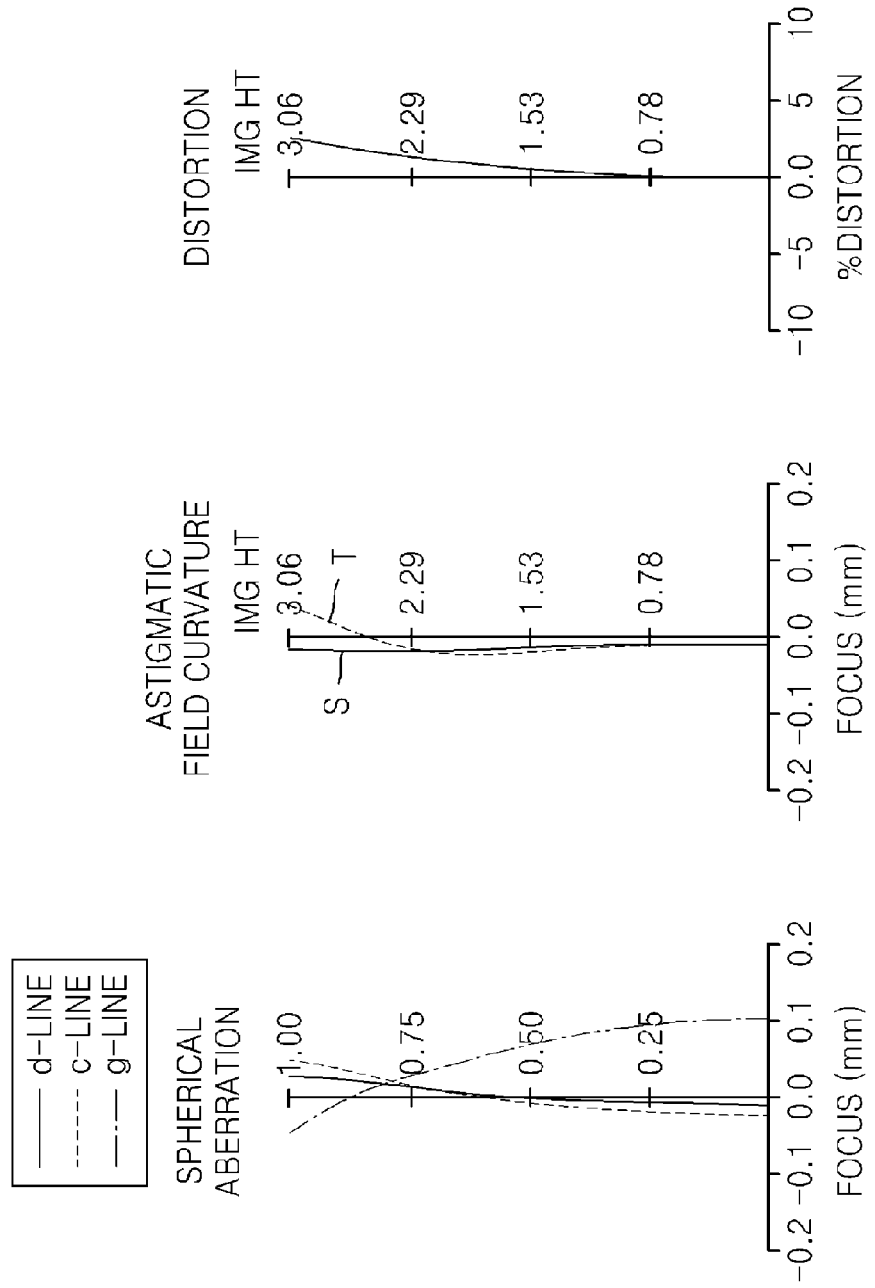
FIG. 16 is an aberration diagram showing longitudinal spherical aberration, astigmatic field curvature, and distortion of the zoom lens of FIG. 13 operating at the telephoto position.

FIGS. 14-16 are aberration diagrams showing longitudinal spherical aberration, astigmatic field curvature, and distortion of the zoom lens of FIG. 13, respectively operating at the wide angle position (FIG. 14), a middle position between the wide angle position and the telephoto position (FIG. 15), and the telephoto position (FIG. 16). Referring to FIGS. 14-16, the longitudinal spherical aberration can appear in light having a wavelength of 656.28 nm (as indicated by a c-line in the longitudinal spherical aberration diagrams of FIGS. 14-16), 587.56 nm (as indicated by a d-line in the longitudinal spherical aberration diagrams of FIG. 14-16), or 435.83 nm (as indicated by a g-line in the longitudinal spherical aberration diagrams of FIGS. 14-16). In the longitudinal spherical aber-ration diagrams, a solid line indicates the d-line; a dashed line indicates the c-line; and a dot-dashed line indicates the g-line. Also, in the longitudinal spherical aberration diagrams, the horizontal axis can denote defocus, and the vertical axis can denote a rate to an open F value. In the astigmatic field curvature diagrams, the horizontal axis can denote defocus, and the vertical axis can denote the height of an image IMG HT. Also, in the astigmatic field curvature diagrams, a solid line S can denote a sagittal image plane, and a dashed line T can denote a meridional image plane. In the distortion diagrams, the horizontal axis can denote percent distortion, and the vertical axis can denote the height of the image IMG HT.

The following tables show the lens data according to the present embodiment.

| Fno | 3.48~3.81~4.45 |
|---|---|
| f | 4.59~7.73~13.38 |
| ω | 35.92~21.73~12.54 |
| D1 | 0.351~2.877~4.812 |
| D2 | 4.811~2.285~0.350 |
| D3 | 4.728~2.799~0.588 |
| D4 | 1.374~3.303~5.514 |

| Surface | Radius of Curvature (R) | Thickness (D) | Refractive Index (nd) | Abbe No. (vd) |
|---|---|---|---|---|
| 1 | 23.363 | 0.520 | 1.94595 | 17.98 |
| 2 | 6.800 | 1.241 | | |
| 3 | INF | 5.900 | 1.88300 | 40.80 |
| 4 | INF | 0.200 | | |
| 5* | 8.534 | 1.489 | 1.75501 | 51.16 |
| 6* | −18.719 | D1 | | |
| 7 | 103.282 | 0.380 | 1.83481 | 42.72 |
| 8 | 5.289 | 0.628 | | |
| 9 | −11.410 | 0.330 | 1.83481 | 42.72 |
| 10 | 6.870 | 0.769 | 1.94595 | 17.98 |
| 11 | 39.797 | D2 | | |
| 12* | 5.838 | 1.112 | 1.49710 | 81.56 |
| 13* | −17.386 | 0.670 | | |
| 14 | INF | D3 | | |
| 15* | 8.999 | 0.980 | 1.49710 | 81.56 |
| 16* | −13.071 | D4 | | |
| 17* | 10.906 | 1.190 | 1.49710 | 81.56 |
| 18* | −8.197 | 0.642 | | |
| 19 | −6.850 | 0.400 | 1.94595 | 17.98 |
| 20 | 16.108 | 3.870 | | |

-continued

| Surface | Radius of Curvature (R) | Thickness (D) | Refractive Index (nd) | Abbe No. (vd) |
|---|---|---|---|---|
| 21 | INF | 0.800 | 1.51680 | 64.20 |
| 22 | INF | 0.900 | | |

| Surface | ∈ | A4 | A6 | A8 | A10 |
|---|---|---|---|---|---|
| 5 | 1.0000 | −0.174626E−03 | 0.112437E−04 | −0.163130E−05 | 0.142745E−06 |
| 6 | 1.0000 | 0.445710E−04 | 0.128589E−04 | −0.146871E−05 | 0.140208E−06 |
| 12 | 1.0000 | −0.940814E−03 | −0.258808E−03 | 0.786859E−04 | −0.824435E−05 |
| 13 | 1.0000 | 0.406094E−03 | −0.257950E−03 | 0.786552E−04 | −0.819287E−05 |
| 15 | 1.0000 | −0.310108E−05 | 0.821332E−04 | −0.241434E−04 | 0.350987E−05 |
| 16 | 1.0000 | 0.653024E−03 | 0.136385E−03 | −0.432446E−04 | 0.581260E−05 |
| 17 | 1.0000 | 0.389439E−03 | 0.316680E−03 | −0.109023E−03 | 0.169552E−04 |
| 18 | 1.0000 | 0.141938E−02 | 0.448397E−03 | −0.151077E−03 | 0.227742E−04 |

<Fifth Embodiment>

Figure 17:
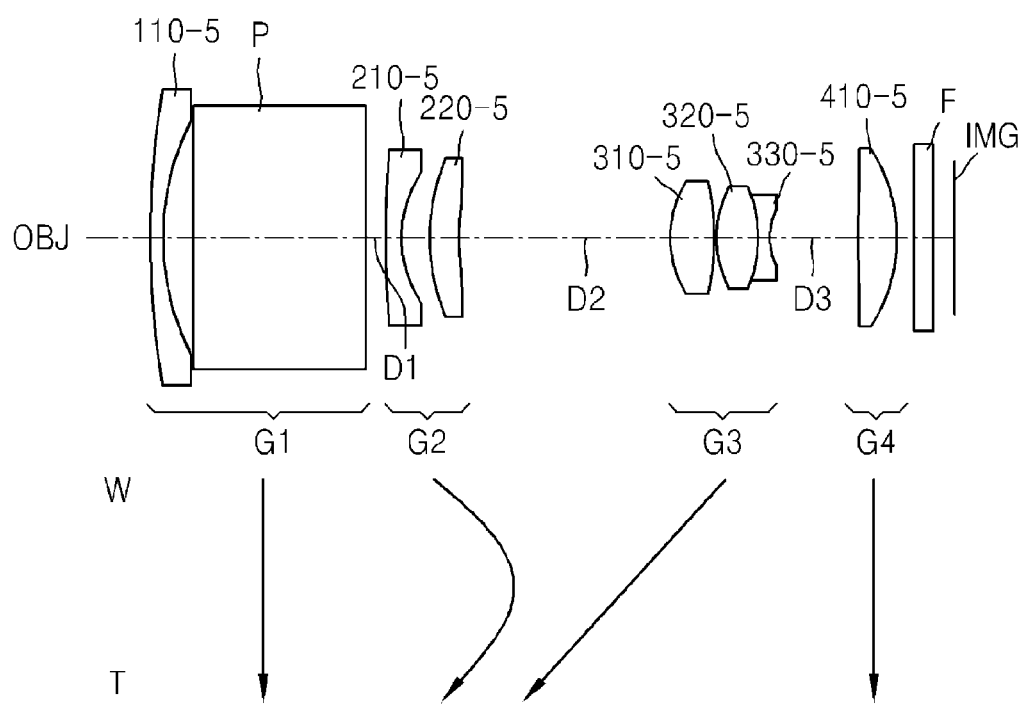
FIG. 17 illustrates an optical arrangement of a zoom lens and movements of lens groups in the zoom lens according to another embodiment.

FIG. 17 illustrates a zoom lens according to another embodiment. Referring to FIG. 17, the zoom lens according to the present embodiment can include a first lens group G1 having a negative refractive power, a second lens group G2 having a negative refractive power, a third lens group G3 having a positive refractive power, and a fourth lens group G4 having a positive refractive power. The first lens group G1, the second lens group G2, the third lens group G3, and the fourth lens group G4 can be arranged such that the first lens group G1 is closer to the object OBJ side, followed by the second lens group G2, the third lens group G3, and the fourth lens group G4, which is closer to the image plane IMG side.

The first lens group G1 can include a first lens 110-5 and the optical path change member P. The first lens 110-5 may be a negative lens and may concave toward the IMG side. The second lens group G2 can include a second lens 210-5 and a third lens 220-5. The second lens 210-5 may be a negative lens in which both surfaces are aspherical. The third lens 220-5 may be a positive lens. The third lens group G3 can include a fourth lens 310-5, a fifth lens 320-5, and a sixth lens 330-5. The fourth lens 310-5 may be a positive lens in which both surfaces are aspherical. The fifth lens 320-5 may be a positive lens. The sixth lens 330-5 may be a negative lens. The fourth lens 320-5 and the fifth lens 330-5 can make a doublet lens. The fourth lens group G4 can include a seventh lens 410-5. The seventh lens 410-5 may be a positive lens in which a surface toward the object OBJ side is aspherical.

During the zooming from the wide angle position W to the telephoto position T, the first and fourth lens groups G1 and G4 can be fixed, as indicated by their respective arrows in FIG. 17, whereas the second and third lens groups G2 and G3 can be moved, as indicated by their respective arrows in FIG. 17. The stop ST can be arranged at the IMG side of the third lens group G3. The infrared filter F can be arranged between the fourth lens group G4 and the IMG.

Figure 18:
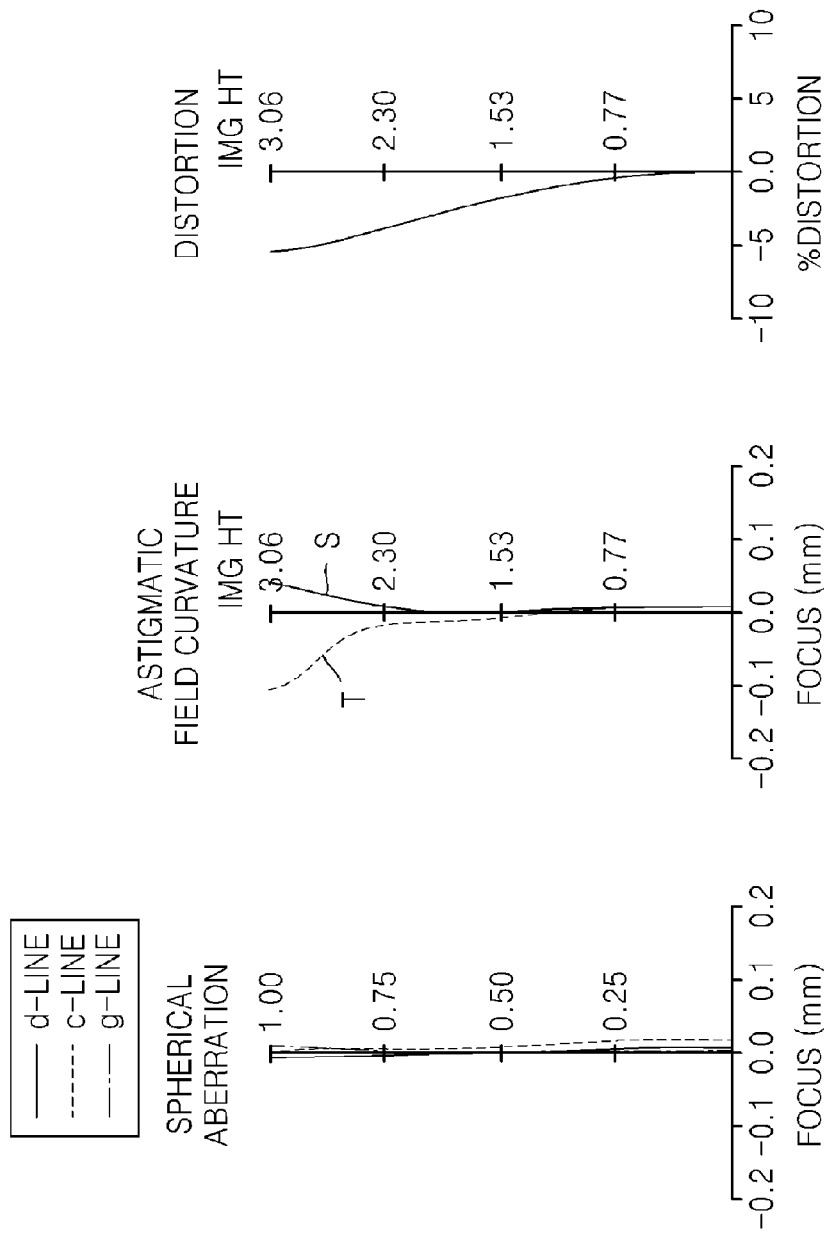
FIG. 18 is an aberration diagram showing longitudinal spherical aberration, astigmatic field curvature, and distortion of the zoom lens of FIG. 17 operating at a wide angle position.
Figure 19:
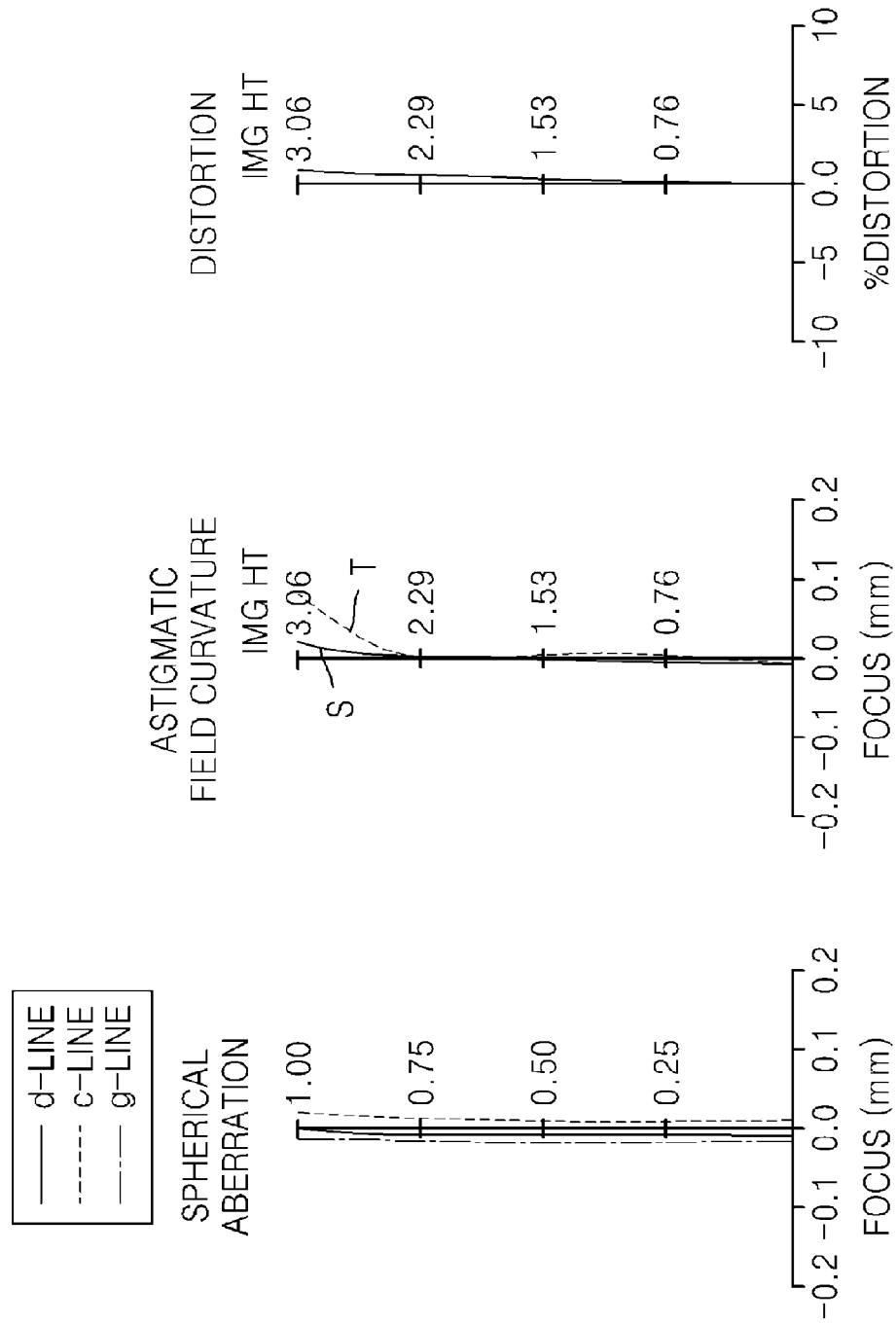
FIG. 19 is an aberration diagram showing longitudinal spherical aberration, astigmatic field curvature, and distortion of the zoom lens of FIG. 17 operating at a middle position between the wide angle position and a telephoto position.
Figure 20:
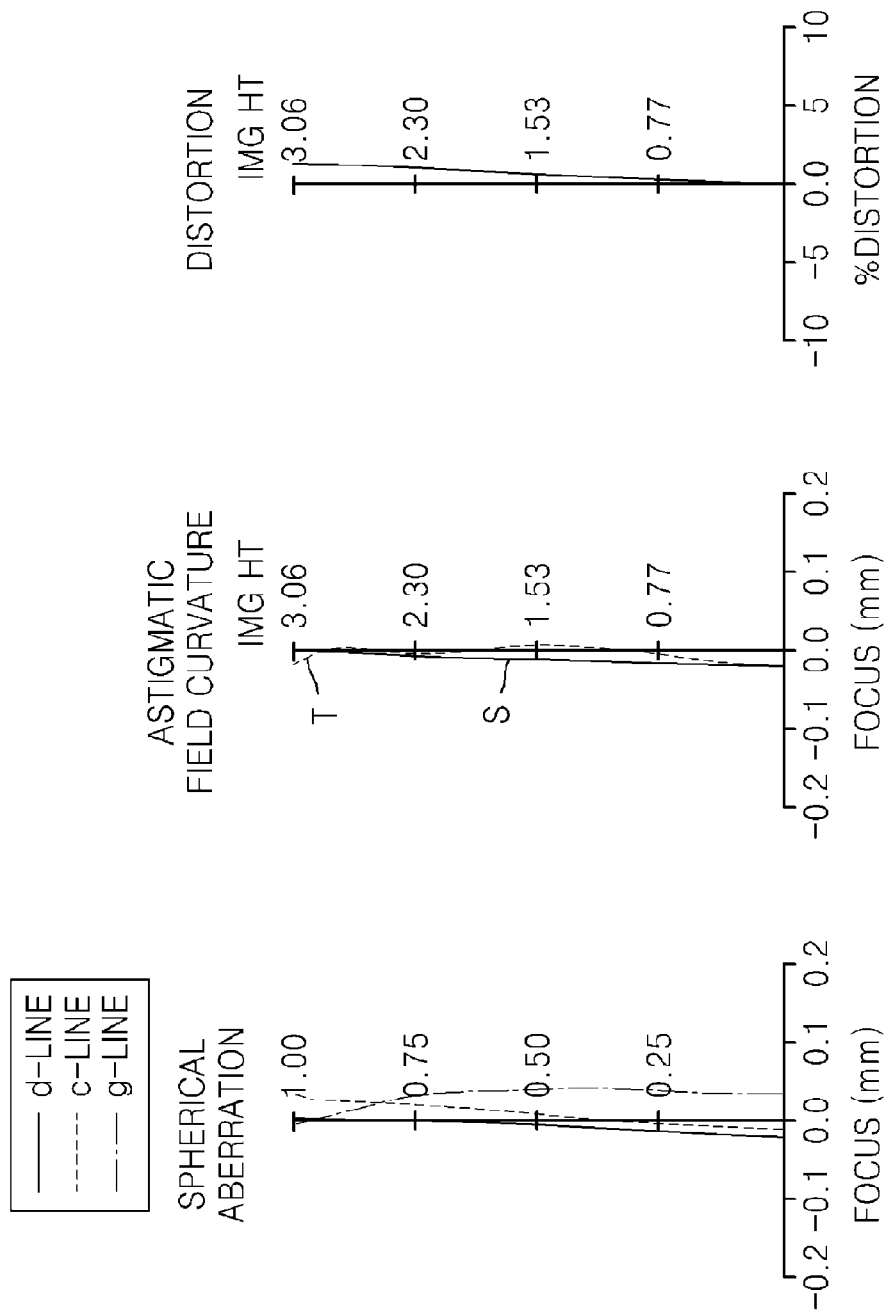
FIG. 20 is an aberration diagram showing longitudinal spherical aberration, astigmatic field curvature, and distortion of the zoom lens of FIG. 17 operating at the telephoto position.

FIGS. 18-20 are aberration diagrams showing longitudinal spherical aberration, astigmatic field curvature, and distortion of the zoom lens of FIG. 17, respectively operating at the wide angle position (FIG. 18), a middle position between the wide angle position and the telephoto position (FIG. 19), and the telephoto position (FIG. 20). Referring to FIGS. 18-20, the longitudinal spherical aberration can appear in light having a wavelength of 656.28 nm (as indicated by a c-line in the longitudinal spherical aberration diagrams of FIGS. 18-20), 587.56 nm (as indicated by a d-line in the longitudinal spherical aberration diagrams of FIG. 18-20), or 435.83 nm (as indicated by a g-line in the longitudinal spherical aberration diagrams of FIGS. 18-20). In the longitudinal spherical aberration diagrams, a solid line indicates the d-line; a dashed line indicates the c-line; and a dot-dashed line indicates the g-line.

Also, in the longitudinal spherical aberration diagrams, the horizontal axis can denote defocus, and the vertical axis can denote a rate to an open F value. In the astigmatic field curvature diagrams, the horizontal axis can denote defocus, and the vertical axis can denote the height of an image IMG HT. Also, in the astigmatic field curvature diagrams, a solid line S can denote a sagittal image plane, and a dashed line T can denote a meridional image plane. In the distortion diagrams, the horizontal axis can denote percent distortion, and the vertical axis can denote the height of the image IMG HT.

The following tables show the lens data according to the present embodiment.

| | |
|---|---|
| Fno | 2.87~4.29~5.55 |
| f | 4.20~7.99~12.19 |
| ω | 37.62~20.79~13.92 |
| D1 | 0.816~3.275~0.716 |
| D2 | 9.133~2.196~0.793 |
| D3 | 3.848~8.326~12.288 |

| Surface | Radius of Curvature (R) | Thickness (D) | Refractive Index (nd) | Abbe No. (vd) |
|---|---|---|---|---|
| 1 | 41.616 | 0.550 | 1.83481 | 42.72 |
| 2 | 11.433 | 1.360 | | |
| 3 | INF | 7.500 | 1.90366 | 31.32 |
| 4 | INF | D1 | | |
| 5* | 37.224 | 0.761 | 1.83441 | 37.28 |
| 6* | 4.893 | 1.155 | | |
| 7 | 8.317 | 1.371 | 1.84666 | 23.78 |
| 8 | 56.394 | D2 | | |
| 9* | 4.411 | 1.903 | 1.49710 | 81.56 |
| 10* | −10.380 | 0.100 | | |
| 11 | 4.644 | 1.800 | 1.83481 | 42.72 |
| 12 | −6.372 | 0.520 | 1.90366 | 31.32 |
| 13 | 2.489 | D3 | | |
| 14* | 26.143 | 1.730 | 1.49710 | 81.56 |
| 15 | −7.115 | 0.780 | | |
| 16 | INF | 0.800 | 1.51680 | 64.20 |
| 17 | INF | 0.900 | | |

| Surface | ε | A4 | A6 | A8 | A10 |
|---|---|---|---|---|---|
| 5 | 1.0000 | −0.113741E−02 | 0.761474E−04 | 0.251338E−05 | −0.221740E−06 |
| 6 | 1.0000 | −0.195393E−02 | 0.317909E−04 | 0.120133E−04 | −0.809030E−06 |
| 9 | 1.0000 | −0.109968E−02 | 0.584662E−04 | −0.168925E−04 | 0.322528E−05 |
| 10 | 1.0000 | 0.972533E−03 | 0.128067E−03 | −0.256947E−04 | 0.507878E−05 |
| 14 | 1.0000 | −0.146002E−02 | 0.999789E−04 | −0.849354E−05 | 0.284345E−06 |

As described above, zoom lenses according to various embodiments may have a bending-type optical structure which is advantageous in miniaturization. Also, the miniaturization may be facilitated by effectively reducing the overall length of an optical system, and superior optical performance may be provided. The zoom lenses according to the above embodiments may be employed in a variety of photographing apparatuses with, for example, photographing devices for converting an optical image formed by the zoom lens into an electric signal.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all equivalent means and differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens comprising:
a first lens group including an optical path change member that changes an optical path, the first lens group being closer to an object side of the zoom lens and being fixed relative to an image plane during a zooming operation;
a second lens group including at least one negative lens, the second lens group being adapted to move during the zooming operation;
a third lens group including at least one positive lens, the third lens group being fixed during the zooming operation and having a positive refractive power, and;
a fourth lens group having a positive refractive power and being closer to an image plane side of the zoom lens, wherein the fourth lens group comprises at least one positive lens having an Abbe number at a d-line greater than 71,
wherein the zoom lens satisfies the condition:

ndL2m>1.71, wherein "ndL2m" is a refractive index at a d-line of one of the at least one negative lens included in the second lens group.

2. The zoom lens of claim 1, wherein the zoom lens satisfies the following condition:

vdL2p<40;

wherein "vdL2p" is an Abbe number at a d-line of one of the at least one positive lens included in the second lens group.

3. The zoom lens of claim 2, wherein the second lens group has a negative refractive power.

4. The zoom lens of claim 2, wherein the first lens group has a positive refractive power.

5. The zoom lens of claim 2, wherein the first lens group has a negative refractive power.

6. A photographing apparatus comprising:
the zoom lens of claim 1; and
a photographing device that converts an optical image formed by the zoom lens into an electric signal.

7. A zoom lens comprising:
a first lens group including an optical path change member that changes an optical path, the first lens group being closer to an object side of the zoom lens and being fixed relative to an image plane during a zooming operation, the first lens group having a positive refractive power;
a second lens group including at least one negative lens and at least one positive lens and having a negative refractive power;
a third lens group including at least one positive lens wherein at least one surface is aspherical and has a shape in which a positive refractive power decreases closer to a paraxial, the third lens group having a positive refractive power and being fixed relative to the image plane during the zooming operation; and
at least one lens group having a positive refractive power, the at least one lens group being closer to an image plane side of the zoom lens, wherein the zoom lens satisfies the following conditions:

$$vdLP > 71;$$

$$vdL2p < 40; \text{ and}$$

$$ndL2m > 1.71,$$

wherein "vdLP" is an Abbe number at a d-line of a positive lens included in a lens group arranged between the image plane side and the second lens group and having a positive refractive power, "vdL2p" is an Abbe number at a d-line of one of the at least one positive lens included in the second lens group, and "ndL2m" is a refractive index at a d-line of one of the at least one negative lens included in the second lens group.

8. A zoom lens comprising:

a first lens group including an optical path change member that changes an optical path, the first lens group being closer to an object side of the zoom lens and being fixed relative to an image plane during a zooming operation;

a second lens group including at least one negative lens, the second lens group being adapted to move during the zooming operation;

a third lens group including at least one positive lens wherein at least one surface is aspherical and has a shape in which a positive refractive power decreases closer to a paraxial, the third lens group being fixed during the zooming operation and having a positive refractive power, and;

a fourth lens group having a positive refractive power and being closer to an image plane side of the zoom lens, wherein the zoom lens satisfies the following conditions:

$$vdLP > 71; \text{ and}$$

$$ndL2m > 1.71,$$

wherein "vdLP" is an Abbe number at a d-line of a positive lens included in a lens group arranged between the image plane side and the second lens group and having a positive refractive power, and "ndL2m" is a refractive index at a d-line of one of the at least one negative lens included in the second lens group.

9. The zoom lens of claim 8, wherein the second lens group has a negative refractive power.

10. The zoom lens of claim 8, wherein the first lens group has a positive refractive power.

* * * * *